United States Patent [19]

Chida et al.

[11] Patent Number: 5,524,194
[45] Date of Patent: Jun. 4, 1996

[54] DATA COMMUNICATION APPARATUS

[75] Inventors: Makoto Chida; Akira Sugiyama, both of Kawasaki; Yoshito Haba, Tokyo; Hitoshi Yasuda, Yokohama, all of Japan

[73] Assignee: Canon Kabushiki Kaisha, Tokyo, Japan

[21] Appl. No.: 386,344

[22] Filed: Feb. 10, 1995

Related U.S. Application Data

[63] Continuation of Ser. No. 758,697, Sep. 12, 1991, abandoned.

[30]     Foreign Application Priority Data

| Sep. 17, 1990 | [JP] | Japan | 2-246718 |
| Oct. 15, 1990 | [JP] | Japan | 2-276091 |
| Oct. 26, 1990 | [JP] | Japan | 2-289338 |
| Nov. 14, 1990 | [JP] | Japan | 2-308119 |
| Dec. 26, 1990 | [JP] | Japan | 2-414508 |

[51] Int. Cl.⁶ .................................................. G06T 1/00
[52] U.S. Cl. .......................... 395/154; 395/153; 371/47.1; 348/232; 348/589; 348/405; 348/448
[58] Field of Search ........................... 395/153, 154, 395/275; 371/31, 32, 47.1; 345/117; 348/232, 500, 589, 604, 714; 358/319, 405, 406, 409, 448; 379/96, 100

[56]                  References Cited

U.S. PATENT DOCUMENTS

| 3,845,240 | 10/1974 | Alaily | 178/7.3 S |
| 4,785,449 | 11/1988 | Nakamura et al. | 370/85 |
| 4,847,840 | 7/1989 | Jinguji | 371/37 |
| 4,887,162 | 12/1989 | Arai | 358/400 |
| 5,018,082 | 5/1991 | Obata et al. | 364/521 |
| 5,077,742 | 12/1991 | Tsumura et al. | 371/32 |
| 5,119,319 | 6/1992 | Tanenbaum | 364/514 |
| 5,142,537 | 8/1992 | Kutner et al. | 371/31 |
| 5,206,859 | 4/1993 | Anzai | 370/110.1 |

FOREIGN PATENT DOCUMENTS 2221363   1/1990   United Kingdom.

OTHER PUBLICATIONS

Pat. Abs. Jp. vol. 8, No. 29 (E–226) Feb. 7, 1984 (JP–A–58 190180).
Pat. Abs. Jp. vol. 11, No. 179 (E–514) Jun. 9, 1987 (JP–A–62012282).
Pat. Abs. Jp. vol. 10, No. 91 (E–394) Apr. 9, 1986 (JP–A–60235592).
Pat. Abs. Jp. vol. 12, No. 481 (E–694) Dec. 15, 1988 (JP–A–63199587).
Pat. Abs. Jp. vol. 11, No. 174 (E–513) Jun. 4, 1987 (JP–A–62007278).
Pat. Abs. Jp. vol. 12, No. 54 (E–583) Feb. 18, 1988 (JP–A–62199189).

*Primary Examiner*—Heather R. Herndon
*Assistant Examiner*—Joseph H. Feild
*Attorney, Agent, or Firm*—Fitzpatrick Cella Harper & Scinto

[57]                  ABSTRACT

A multi-media communication apparatus has functions of receiving/transmitting images, audio signals, code data and the like. A detection unit detects an error in an image signal received from a communication partner's terminal. A transmission unit transmits a picture renewal request command to the partner's terminal based on a detection signal from the detection unit to automatically recover a disturbance of the received image. If the received image becomes discontinuous or disturbed at time of frame synchronization error or the like, the image immediately before the occurrence of disturbance or a different image, e.g., an image for informing the operator of the apparatus condition, is displayed in place of the disturbed image. The operator can be informed of the occurrence of a communication error through the same media as those used for communication before the occurrence of the error.

7 Claims, 20 Drawing Sheets

FIG. 9A
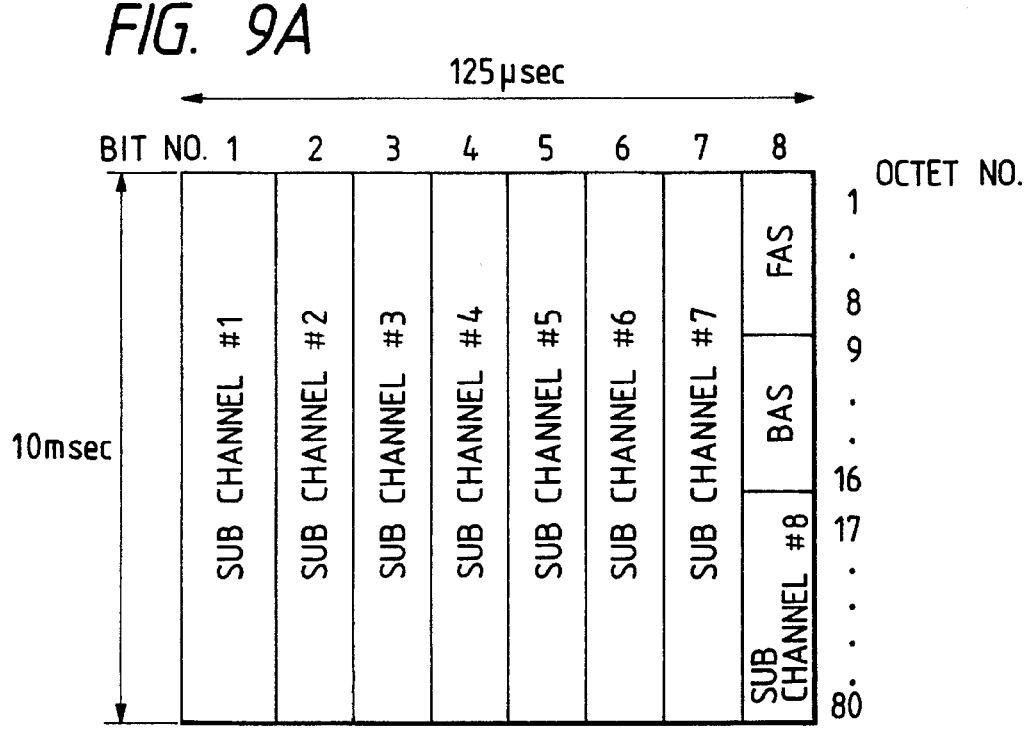
FIG. 9B
FIG. 9C
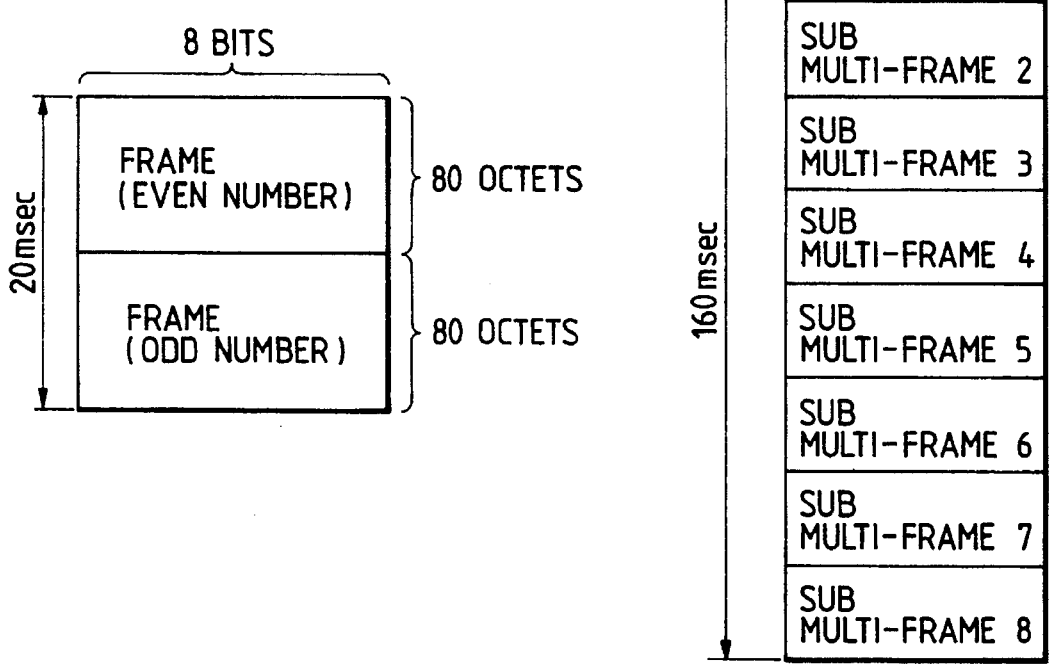

FIG. 10A

| SERVICE CHANNEL BIT NO. OF EACH FRAME \ FRAME | 1 | 2 | 3 | 4 | 5 | 6 | 7 | 8 |
|---|---|---|---|---|---|---|---|---|
| EVEN FRAME | $X_{EVEN}$ | 0 | 0 | 1 | 1 | 0 | 1 | 1 |
| ODD FRAME | $X_{odd}$ | 1 | A | E | $C_1$ | $C_2$ | $C_3$ | $C_4$ |

FIG. 10B

| FRAME NO. | 1 | 3 | 5 | 7 | 9 | 11 | 13 | 15 |
|---|---|---|---|---|---|---|---|---|
| $X_{odd}$ | $N_1$ | $N_2$ | $N_3$ | $N_4$ | $N_5$ | $R_1$ | $R_2$ | TEA |

FIG. 10C

| FRAME NO. | 0 | 2 | 4 | 6 | 8 | 10 | 12 | 14 |
|---|---|---|---|---|---|---|---|---|
| $X_{EVEN}$ | 0 | 0 | 1 | 0 | 1 | 1 | $R_3$ | $R_4$ |

FIG. 11A

| BIT NO. | $b_0$ | $b_1$ | $b_2$ | $b_3$ | $b_4$ | $b_5$ | $b_6$ | $b_7$ |
|---|---|---|---|---|---|---|---|---|
| BAS CONTENTS | ATTRIBUTION | | | ATTRIBUTION VALUE | | | | |

FIG. 11B

| $b_0$ | $b_1$ | $b_2$ | COMMAND OR ABILITY |
|---|---|---|---|
| 0 | 0 | 0 | AUDIO ENCODE COMMAND |
| 0 | 0 | 1 | TRANSFER RATE COMMAND |
| 0 | 1 | 0 | VIDEO AND OTHER COMMAND |
| 0 | 1 | 1 | DATA COMMAND |
| 1 | 0 | 0 | TERMINAL ABILITY 1 |
| 1 | 0 | 1 | TERMINAL ABILITY 2 |
| 1 | 1 | 0 | UNDEFINED |
| 1 | 1 | 1 | ESCAPE CODE |

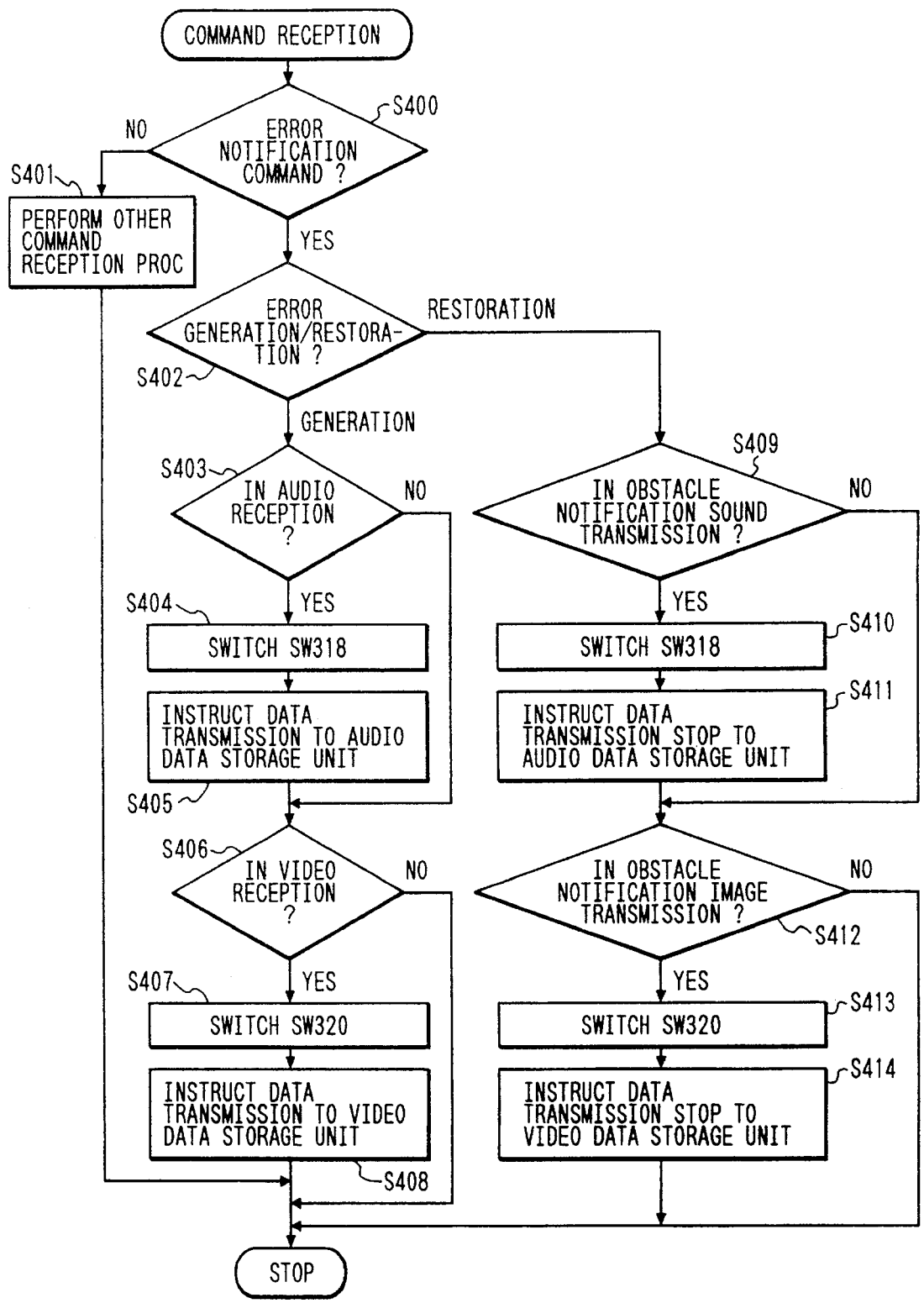

DATA COMMUNICATION APPARATUS

This application is a continuation of application Ser. No. 07/758,697, filed Sep. 12, 1991, now abandoned.

BACKGROUND OF THE INVENTION

1. Field of the Invention

This invention relates to a data communication apparatus for communication using a plurality of kinds of data, such as image data, audio data, and code data (hereinafter referred to simply as data).

2. Related Background Art

With the recent development of communication technology, semiconductor technology and optical technology, digital communication lines have been provided to enable high-speed large-capacity data transmission.

Specifically, digital transmission is free from reduction in data quality during transmission and ensures that data can be uniformly maintained at a suitable quality level. Also, digital transmission enables integration of media since it does not require selection of data transmission paths in accordance with characteristics of media. Use of digital transmission has therefore enabled transmission between composite media, and telephone terminals capable of simultaneously transmitting images together with speech have been developed from conventional telephone terminals transmitting speech alone.

Under these circumstances, international standardization for enabling communication between different kinds of composite terminals is being forwarded by CCITT or other organizations, and service rules for audio-visual (AV) services such as TV telephone or TV meeting system with digital lines, protocol rules and multi-media multiplexed frame construction rules have been made public in the CCITT recommendations (drafts) H.320, H.242, H.221, etc.

In H.221, exchange between frame constructions and between terminal capabilities, frame alignment signals (FAS) for communication modes, and code assignment for bit allocation signal (BAS) with respect to AV service from 64 to 1,920 kbps are defined. In H.242, protocols for capability exchange and communication code changeover between AV terminals using BAS are defined. In H.320, system aspects for overall AV service are defined.

These recommendations or drafts of recommendation provide a method for performing, after setting an end-to-end physical connection and establishing synchronization by FAS during in-channel, multi-media communication between terminals using images, voice and data based on procedures such as sequence of operations for terminal capability exchange using BAS during in-channel and sequence of operations for mode changeover by communication mode designation. However, changing the self terminal capability at each terminal according to situations and selection of the communication mode within the range of exchanged capability are not included in the scope of the rules. The rate of information transfer on each of media in multi-media communication is determined in such a manner that the audio information transfer rate is determined by designating an audio encoding method, the data information transfer rate is determined by designating whether or not data is used and a transfer rate in the case of use, and the image information transfer rate is determined as the remainder of subtraction of the audio information transfer rate and the data information transfer rate from the overall information transfer rate of the set communication path.

In the system of conventional multi-media terminals defined as described above, however, communication between terminals using image data is performed as described below. Ordinarily, when a terminal is connected to a communication partner's terminal, the display is changed over from a picture showing the operation of the multi-media terminal to a received image. Thereafter, displaying received images is continued unless the communication is completed or the operator changes the display by intention. However, the display cannot be changed also when the partner's terminal stops the image data transmission or changes the transmitted information for information through other media. In such a case, the display continues showing meaningless images or shows a disturbed image.

According to the CCITT recommendation (or recommendation draft) H.261, there are generally two modes of image signal encoding:

an intra-mode in which one-frame picture is divided into 12×33 blocks or 3×33 blocks (macro-blocks), the difference between each of these blocks and the original picture is calculated and image data on the difference alone is transmitted; and an inter-mode in which data on the true images of macro-blocks is transmitted without using the above difference. This recommendation also provides that transmission is performed in the inter-mode at least one time every 132nd transmission with respect to macro-blocks to control accumulation of errors.

The CCITT recommendation (or recommendation draft) H.221 provides that when a picture renewal request BAS command is received, data for one-frame picture is transmitted in the inter-mode.

In this conventional system, however, macro-blocks are renewed at predetermined intervals and there is therefore a need to renewing the picture based on user's judgment by transmitting a picture renewal command to the partner's terminal each time an error occurs in a received image signal during image transmission/reception.

On the other hand, processing at the time of occurrence of a frame synchronization error is described in H.242. According to this description, when a frame synchronization error occurs and it is detected on the receiving side, a timer T3 (10 sec.) is set to recover frame synchronization. If the frame synchronization is recovered before timer termination, the ordinary operation is restarted. If the frame synchronization is not recovered before timer termination, synchronization is performed from the beginning.

In the above-described conventional system of multimedia terminals, however, if a line disorder or a disorder of an image receiving unit of a terminal takes place during image data communication between terminals, or if image data is changed at the time of connection/disconnection with a partner's terminal or at the time of changing the transmission capability, omission or disorder of image data occurs and this condition directly influences the displayed picture so that the screen is blacked out or an image disturbance occurs. Moreover, during the period of time for reestablishing the synchronized state, no video and audio signals are supplied and there are no outputs on the screen, which condition gives the operator a feeling of uneasiness, and the operator cannot discriminate whether such a state follows occurrence of an error or completion of communication. There is also the problem of a discontinuity between pictures received before occurrence of a frame synchronization error and after recovery of frame synchronization.

SUMMARY OF THE INVENTION

In view of the above-described problems, an object of the present invention is to provide a data communication apparatus in which an omission or error in an image data during communication does not appear in the resulting picture.

Another object of the present invention is to provide a data communication apparatus in which when an error such as synchronization error occurs in a received image signal, an image for control is automatically displayed.

Still another object of the present invention is to provide a data communication apparatus which is capable of communication using a plurality of categories of data such as image data, voice data and code data, and which determines whether or not there is image data in communication data and displays an image for control if there is no image data.

A further object of the present invention is to provide a data communication apparatus arranged to prevent a discontinuity between pictures received before occurrence of a frame synchronization error and after recovery of frame synchronization when the synchronization error occurs during reception of image data.

It is a still further object of the present invention to provide a data communication apparatus capable of suitably informing the operator of the condition of the apparatus by outputting error information speech or image when an error in a received frame is detected.

It is a still further object of the present invention to provide a data communication apparatus arranged to renew a picture by automatically transmitting a picture renewal request command to a partner's terminal in a case where an error occurs in a received image signal during image transmission/reception.

These and other objects of the present invention will become apparent from the following detailed description of the invention made with reference to the accompanying drawings.

BRIEF DESCRIPTION OF THE DRAWINGS

FIGS. 9A to 9C are diagrams of frame construction;

FIGS. 10A to 10C are diagrams of bit construction in FAS;

FIGS. 11A and 11B are diagrams of bit construction in BAS;

FIG. 21 is a flow chart of the operation procedure of the apparatus of the fifth embodiment.

DESCRIPTION OF THE PREFERRED EMBODIMENTS

Embodiments of the present invention will be described below with reference to the accompanying drawings.

[First Embodiment]

Figure 1:
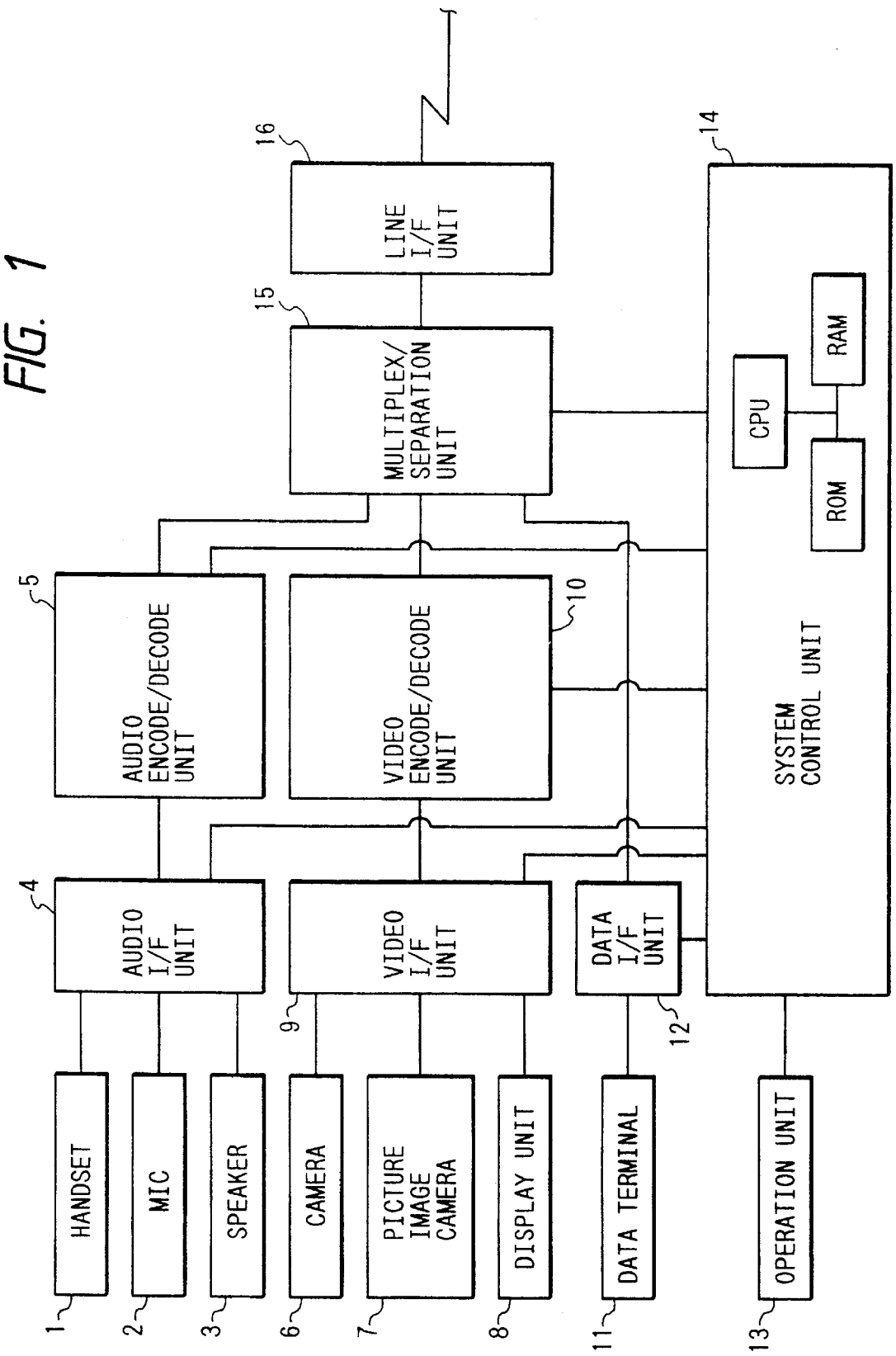
FIG. 1 is a block diagram of a multi-media communication apparatus in accordance with a first embodiment of the present invention.

FIG. 1 is a block diagram of a multi-media communication apparatus in accordance with the first embodiment of the present invention. The multi-media communication apparatus has a handset 1 provided as an audio input/output means, a microphone 2 provided as an audio input means, and a speaker 3 provided as an audio output means. The handset 1, the microphone 2 and the speaker 3 are connected to an audio interface unit 4. The audio interface unit 4 is instructed by a later-described system control unit 14 to perform each of various kinds of processing including changeover processing for changing the operations of the handset 1, the microphone 2 and the speaker 3 provided as audio input/output means, on/off-hook detection processing for detecting whether the handset 1 is in an on-hook state or an off-hook state, echo cancel processing for cancelling echoes when the microphone 2 and the speaker 3 provided as audio input/output means are operated, and processing for generating tones such as a dial tone, a call tone, a busy tone and an incoming tone. The audio interface unit 4 is connected to an audio encode/decode unit 5.

The audio encode/decode unit 5 is instructed by the system control unit 14 to encode a voice signal to be transmitted or to decode a received voice signal in accordance with algorisms for encoding/decoding voice signals of 64 kbps PCM A-low, 64 kbps PCM μ-law, 64/56/48 kbps SB-ADPCM, 32 kbps ADPCM, 16 kbps (e.g., APC-AB), 8 kbps, and the like.

A camera 6 is provided as an image input means to input a self-portrait image and the like, and a picture image camera 7 is provided as another image input means to input pictures, drawings and the like. A display unit 8 serves to display an image input through the camera 6 or the picture image camera 7, an image received from the communication partner, an operation picture and the like. The camera 6, the picture image camera 7 and the display unit 8 are connected to a video interface unit 9. The video interface unit 9 is instructed by the system control unit 14 to perform processing for changing the image input means, processing for changing input and received images and operation pictures, image signal composition processing for displaying these images by dividing the frame on the display 8, and other kinds of processing. The video interface unit 9 is connected to a video encode/decode unit (image data error detection means) 10 which encodes transmitted image signals and decodes received image signals in accordance with the CCITT recommendation (or recommendation draft) H.261.

A data terminal 11 for performing data communication is connected to a data interface unit 12. The data interface unit 12 sends transmitted data supplied from the data terminal 11 and the system control unit 14 to a later-described multiplex/ separation unit 15, and sends received data to the data terminal 11 or the system control unit 14. An operation unit 13 including a keyboard, a touch panel or the like used to input control information for overall control of the apparatus is connected the system control unit 14 together with the video interface unit 9 and the data interface unit 12. The system control unit 14 has a CPU, a ROM, a RAM, an auxiliary memory and other components. The system control unit 14 monitors the conditions of the other units of the apparatus to effect overall control of the apparatus, forms operation/display pictures according to the conditions, executes application programs and performs other operations. The audio encode/decode unit 5, the video encode/decode unit 10 and the data interface unit 12 are connected to the multiplex/separation unit (picture renewal request signal transmitting means) 15. The multiplex/separation unit 15 multiplexes a voice signal from the audio encode/decode unit 5, an image signal from the video encode/decode unit 10, data from the data interface unit 12 and BAS from the system control unit 14 with respect to transmitted frames in accordance with the CCITT recommendation (or recommendation draft) H.221, separates a received frame with respect to each of media constituting the frame and sends separated data to the relating units. The multiplex/separation unit 15 is connected to a line interface unit 16 which controls the line based on the ISDN user network interface.

Figure 2:
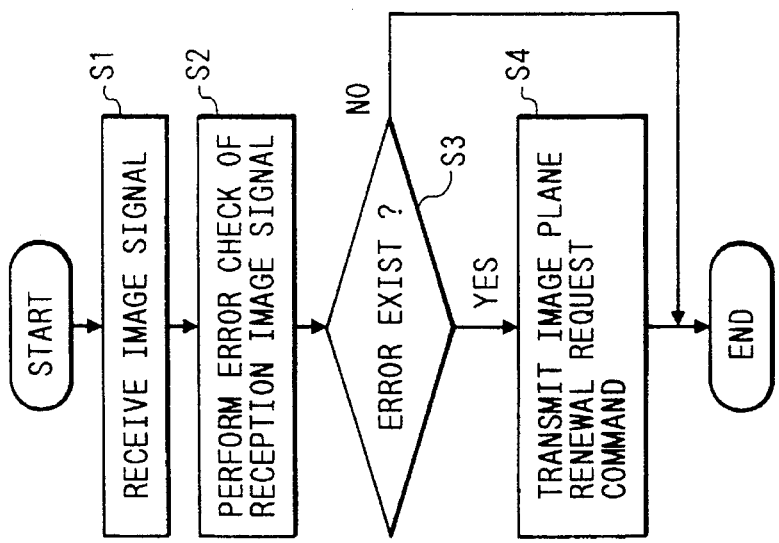

The operation of the multi-media communication apparatus in accordance with the present invention will be described below with reference to the flow chart of FIG. 2. When the operation is started, data received through the line is supplied to the multiplex/separation unit 15 through the line interface 16 to be separated into a voice signal, an image signal and a data communication signal, and the received image signal is decoded by the video encode/decode unit 10 (step S1).

When the received image signal is decoded by the video encode/decode unit 10, BCH error checking in accordance with the CCITT recommendation (or recommendation draft) H.261 is performed (step S2). If an error is detected in the received image signal, that is, in the case of YES in step S3, the video encode/decode unit 10 outputs an error detection signal to the system control unit 14. If no error is detected in the received image signal, that is, in the case of NO in step S3, this control is terminated and the apparatus becomes ready for receiving the next image signal (step S3).

When the system control unit 14 receives the error detection signal from the video encode/decode unit 10, it outputs an instruction signal to the multiplex/separation unit 15 to make this unit transmit a picture renewal request BAS command to the partner's terminal. When the multiplex/separation unit 15 receives this instruction signal, it sets a picture renewal request in BAS and transmits a picture renewal request BAS command to the partner's terminal through the line interface unit 16 (step S4).

Figure 3:
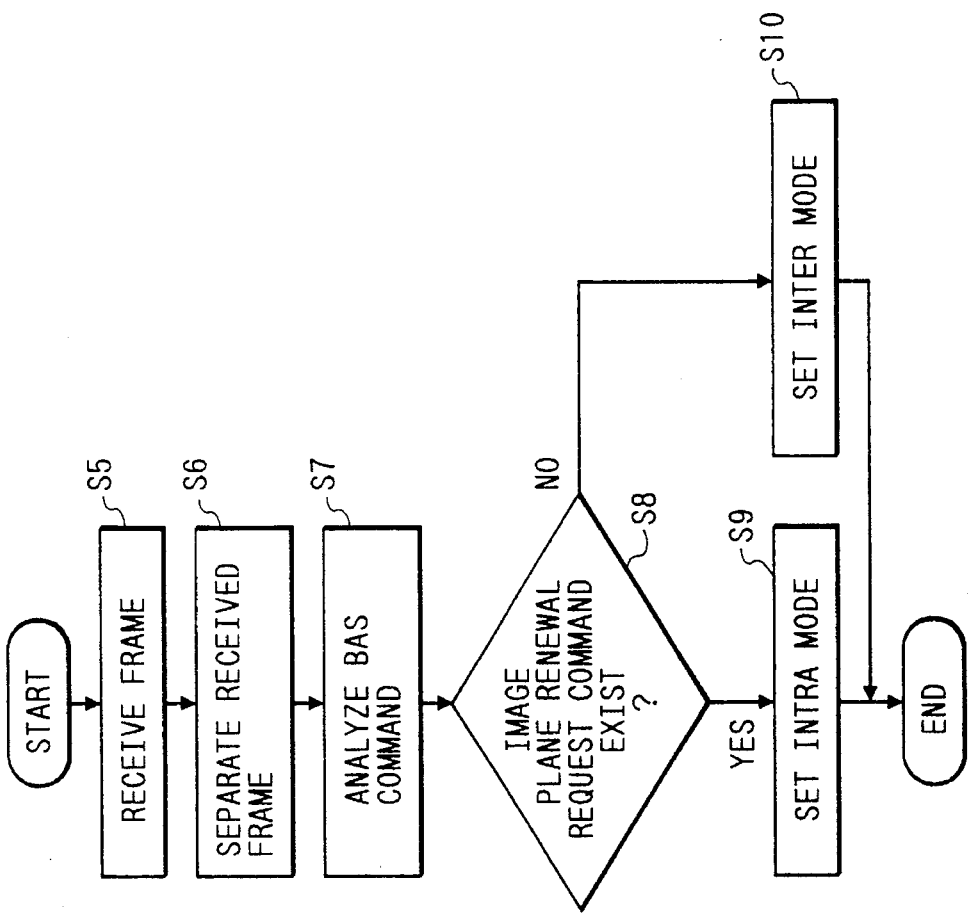
FIGS. 2 and 3 are flow charts of a control operation in accordance with the first embodiment.

Next, the operation of the partner's terminal will be described below with reference to the flow chart of FIG. 3. The partner's terminal has the same construction as in the above. When a picture renewal request BAS command is transmitted in step S4 of FIG. 2, the multiplex/separation unit 15 of the partner's terminal receives this command through the line interface unit 16 (step S5).

The multiplex/separation unit 15 separates the frame received in step S5 into four signals: voice signal, image signal, data communication signal and BAS command, and transmits the voice signal to the audio encode/decode unit 5, the image signal and the BAS command to the video encode/decode unit 10, and the data communication signal to the data interface unit 12 (step S6).

The video encode/decode unit 10 analyzes the BAS command (step S7).

If there is a picture renewal request command, that is, in the case of YES in step S8, the transmission encoding algorism is set to the intra-mode (in which only image data on the difference from the original picture is transmitted) (step S9). If there is no picture renewal request command, that is, in the case of NO in step S8, the algorism is set to the inter-mode (in which data on the true image is transmitted) (step S10), thereby completing the control. Thus, if a picture updating request command is transmitted from the partner's terminal, image data on the difference from the original picture is transmitted to enable recovery from an error by the partner's terminal.

At the time of detection of an error in the received image signal, if an error occurs only one time, there is a possibility that the error is regarded as a non-significant error such as temporary image disturbance. The arrangement may therefore be such that an error detection signal is supplied to the system control unit 14 if an error occurs a plurality of times and is regarded as a significant error.

As described above, the multi-media communication apparatus in accordance with the first embodiment of the present invention, which has an image transmission/reception function, is characterized by being provided with a detection means for detecting an error in a received image signal, and a transmission means for transmitting a picture renewal request command to the partner's terminal based on a detection signal from the detection means.

It is therefore possible to automatically recover from image disturbance by detecting the corresponding error in the received image signal and automatically transmitting a picture renewal request command to the partner's terminal.

[Second Embodiment]

The second embodiment of the present invention will be described below in which if a data synchronization error occurs during communication using image data, a control image is displayed instead of the disturbed received image.

Figure 4:
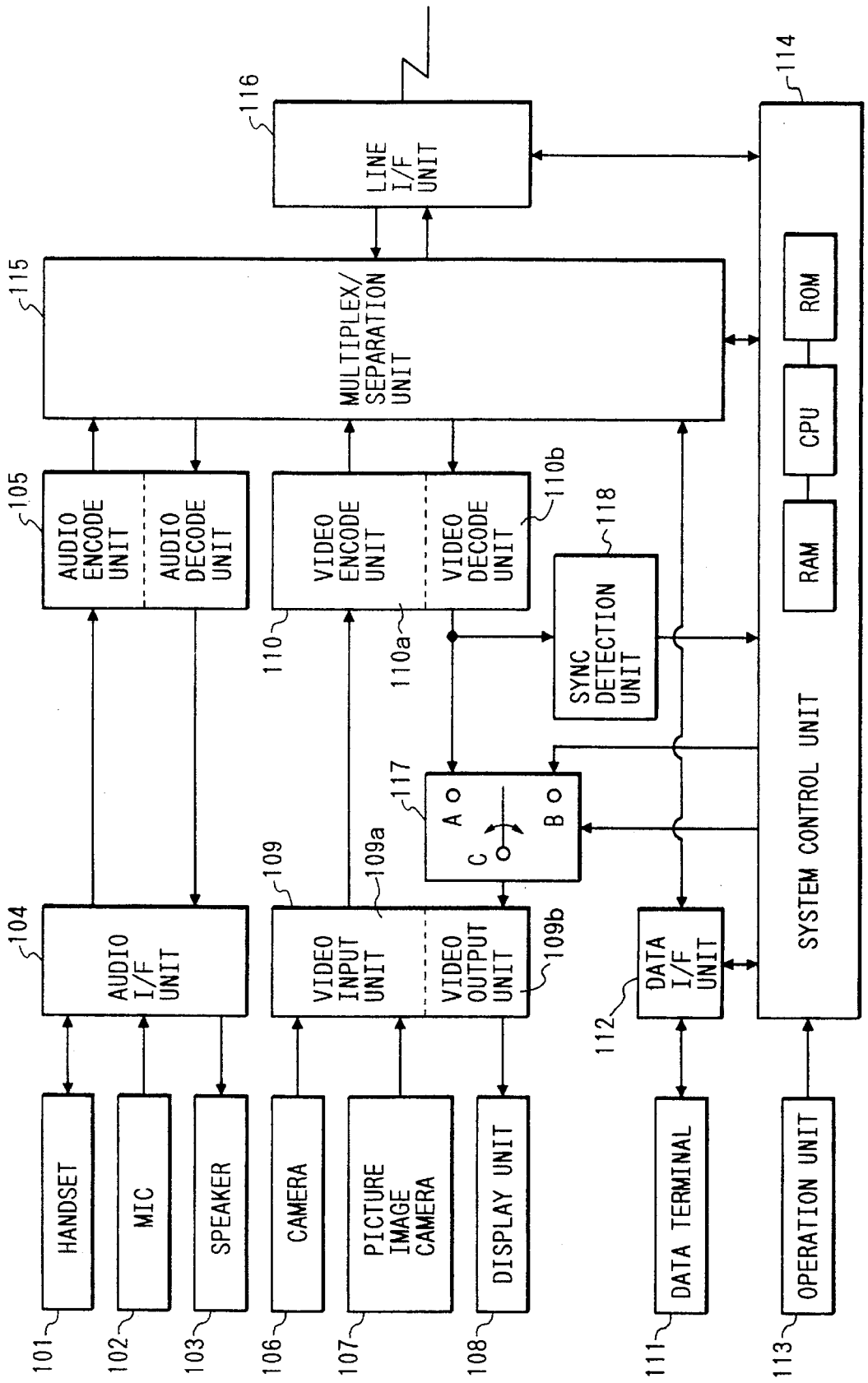
FIG. 4 is a block diagram of a multi-media communication apparatus in accordance with second and third embodiments of the present invention.

FIG. 4 is a block diagram of a multi-media terminal in accordance with the second embodiment.

The multi-media terminal shown in FIG. 4 has a handset 101 provided as an audio input/output means, a microphone 102 provided as an audio input means, a speaker 103 provided as an audio output means, and an audio interface unit 104. The audio interface unit 104 has functions started by instructions from a later-described system control unit 114, i.e, a function for changing the handset 101, the microphone 102 and the speaker 103 provided as audio input/output means, a gain control function for controlling gain to control volume level, an on/off-hook detection function for detecting whether the handset 101 is in an on-hook state or an off-hook state, an echo cancel function for cancelling echoes when the microphone 102 and the speaker 103 provided as audio input/output means are used, and a tone generation function for generating tones such as a dial tone, a call tone, a busy tone and an incoming tone. An audio encode/decode unit 105 is instructed by the system control unit 114 to encode, by A/D conversion, a voice signal to be transmitted or to decode a received voice signal by D/A conversion in accordance with the algorism for encoding/decoding voice signals of 64 kbps PCM (A-law), 64 kbps PCM (µ-law), 64/56/48 kbps (SB-ADPCM), 32 kbps ADPCM, 16 kbps (e.g., APC-AB), 8 kbps, and the like.

A camera 106 is provided as an image input means to input a self-portrait image and the like, and a picture image camera 107 is provided as another image input means to input pictures, drawings and the like. A display unit (display means) 108 displays an image input through the camera 106 or the picture image camera 107, an image received from the communication partner, and an image from the system control unit 114. A video interface unit 109 has functions started by instructions from the system control unit 114, i.e., a function for changing the image input means, processing for changing input and received images and operation pictures, a function for changing the display of the above-mentioned images and for dividing the display frame, and a signal conversion function for establishing electrical/physical matching with video signals from the image input/output means. A video encode/decode unit 110 has a function for encoding, by A/D conversion, an image to be transmitted and a function of decoding a received image by D/A conversion. The video encode/decode unit 110 effects band compression of a large amount of raw image data by various means such as movement compensation, frame thinning, inter-frame compensation, in-frame compensation, DCT conversion, and vector quantization conversion to reduce the amount of data so that the image data can be transmitted through the digital line. Presently, the basic interface of the ISDN line has a transmission speed of 65 kbps, and an image encoding system enabling transmission at this transmission speed is, for example, the one proposed in the CCITT recommendation draft H.261.

A data terminal 111 performs data communication. A data interface unit 112 sends transmitted data from the data terminal 111 and the system control unit 114 to a multiplex/separation unit 115, and sends received data to the data terminal 111 or the system control unit 114. An operation unit 113 includes a keyboard, a touch panel or the like used to input control information for controlling the apparatus of FIG. 4. The system control unit 114 has a CPU, a ROM, a RAM, an auxiliary memory, a character generator, an image signal generation circuit and other components. The system control unit 114 monitors the conditions of the other units to effect overall control of the apparatus, forms operation/display pictures according to the conditions, executes application programs and performs other operations. The multiplex/separation unit 115 multiplexes voice data from the audio encode/decode unit 105, image data from the video encode/decode unit 110, data from the data interface unit 112 and BAS from the system control unit 114 with respect to transmitted frames, separates a received frame with respect to each of media constituting the frame and sends separated data to the relating units. The multiplex/separation unit 115 operates in accordance with the CCITT recommendation H.221. A line interface unit 116 controls the line based on the ISDN user network interface.

A video input unit 109a and a video output unit 109b (video input/output means) constitute the video interface unit 109. A video encode unit 110a and a video decode unit 110b constitute the video encode/decode unit 110. An image changeover circuit (image changeover means) 117 selects one of a received image signal from the video decode unit 110b and a control image signal from the system control unit 114, and transmits the selected signal to the video output unit 109b. A sync detection unit 118 detects a sync state of a received image signal from the video decode unit 110b and informs the system control unit (control means) 114 of the result of this detection.

The sync detection unit 118 monitors horizontal/vertical synchronization signals in a video signal which is a received image signal, determines that the signal is synchronized if a constant correct cyclic signal is generated, or that the signal is not synchronized if no cyclic signal is generated or if the cycle is not correct, and informs the system control unit 14 of this state.

If a video encode error occurs in the video decode unit 110b, the sync signal is disturbed to operate the sync detection unit 118. If a video encode error occurs, it can be regarded as an synchronization error since images are real-time processed as in the case of voice and since an error which cannot be corrected by correction bits cannot be recovered by re-transmission or the like. Therefore a detection method may alternatively used in which the sync detection unit 118 is informed of occurrence of this kind of error to recognize a sync error and to inform the system control unit 114 of this state.

Figure 5:
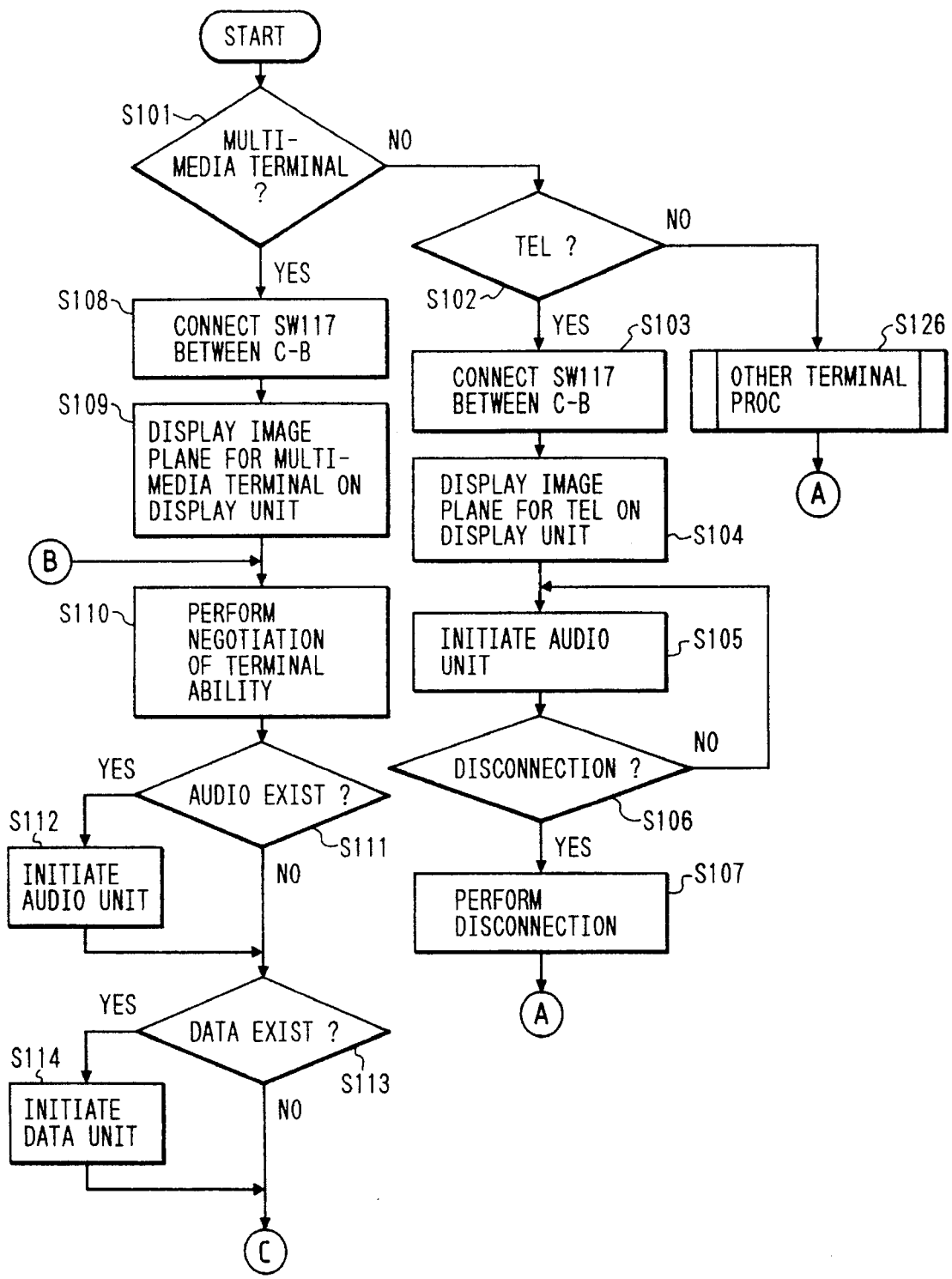
FIGS. 5 and 6 are flow charts of a control operation in accordance with the second embodiment.
Figure 6:
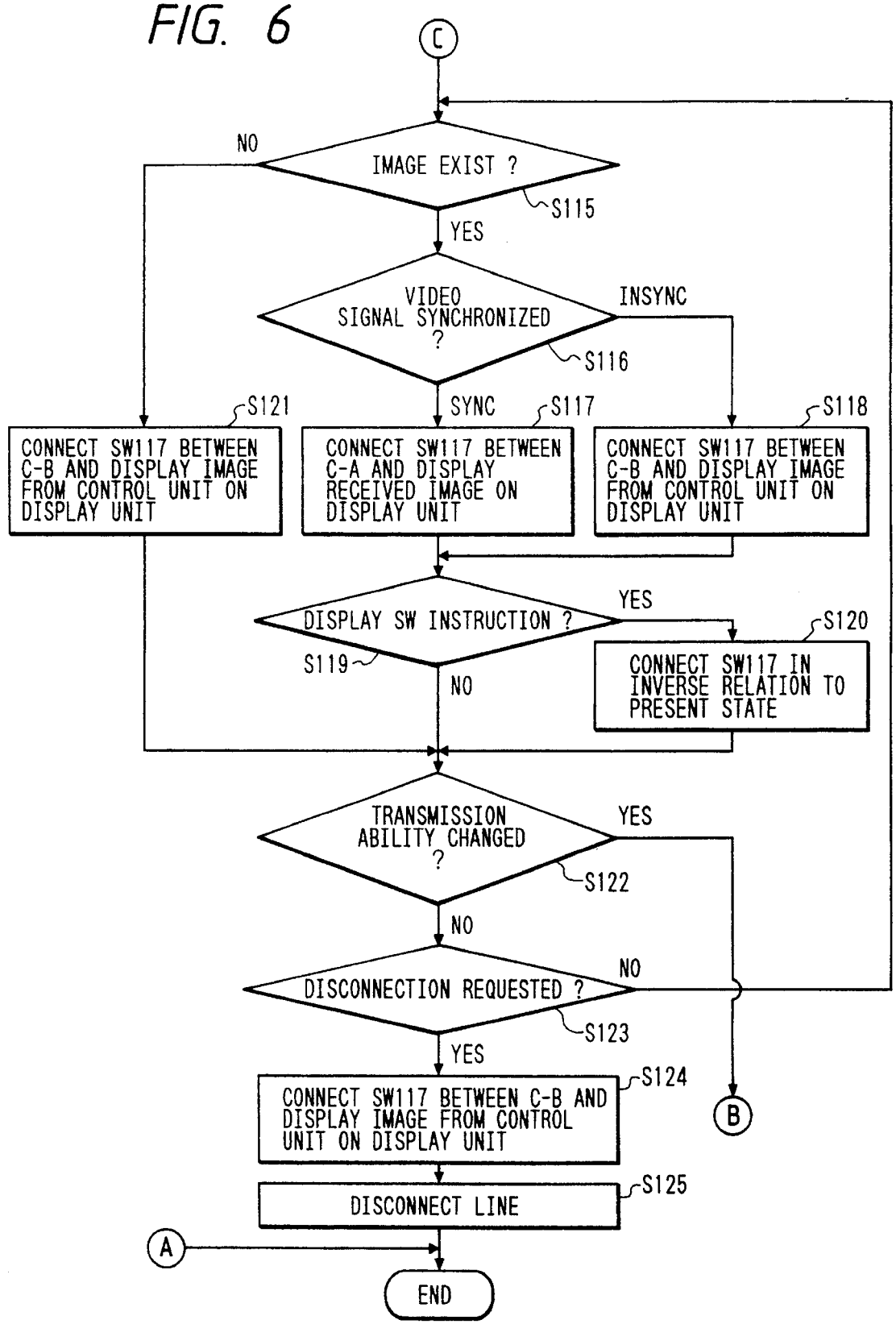

FIGS. 5 and 6 shows flows of the operation of the second embodiment. Referring to FIG. 5, determination is first made as to whether communication is performed by a multi-media terminal or a telephone terminal (that is, by using voice alone) (step S101). In the case of telephone communication, the video changeover unit 117 is operated to establish connection between points C and B (steps S102, S103). A telephone picture (control image signal) prepared by the system control unit 114 is displayed by the display unit 108 (step S104). As the telephone picture, a picture showing a menu necessary for telephone is displayed. For example, at the time of calling, a telephone number list of a telephone directory and a telephone number input by keys are displayed, or at the time of call acceptance, the partner's telephone number, if the partner can be identified, and other information are displayed. During talking, the talking time and other information are displayed. Next, the audio units, the components 101 to 105, are started (step S105) to continue operating until disconnection (steps S106, S107). After disconnection, an initial picture, e.g., a menu picture for selection of multi-media terminals, telephone and other terminals is displayed.

In the case of communication by a multi-media terminal, the video changeover unit 117 is operated to establish connection between the points C and B (step S108). A multi-media terminal picture prepared by the system control unit 114 is displayed by the display unit 108 (step S109). As this picture, a picture showing a menu necessary for the multi-media terminal is displayed. For example, at the time of calling, a picture for selection of kinds of media used for communication, for setting capability with respect to each medium, a list of partner's terminal numbers and a number input by keys, used as in the case of telephone communication, is displayed. At the time of call acceptance, the capability of the partner's terminal or the capability determined by capability exchange is displayed and, if the partner can be identified, the partner's telephone number is displayed.

After connection to the partner's terminal and negotiation by capability exchange (step S110), the audio units are started (steps S111, S112) if an audio capability is required, and the data units, i.e., the components 111 and 112 are started (steps S113, S114) if a data capability is required. If a video capability is required, a sync/sync error in a video signal is detected by the sync detection unit 118 (steps S115, S116), and an image is received from the partner's terminal. After the video signal has been synchronized, the system control unit 114 recognizes this state, the video changeover unit 117 is operated to establish connection between points C and A, and the partner's image decoded by the video decode unit 110b is output to the display unit 108 through the video output unit 109b (step S117). If a sync error has occurred, the video changeover unit 17 is operated to establish connection between points C and B and an image prepared by the system control unit 114 is displayed by the display unit (step S118). For example, a message, such as "wait a moment", is displayed to inform the operator of the state of waiting for reception of the partner's image. If a display changeover instruction is supplied from the operation unit 113 by key input means or the like, the system control unit 114 makes the video changeover unit 117 change over to the switch position opposite to the present switch position (steps S119, S120). For example, if connection between points C and A has been maintained, the changeover unit 117 changes over for connection between points C and B, or if connection between points C and B has been maintained, the changeover unit 117 changes over for connection between points C and A. If there is no image in step S115, the video changeover unit 117 is operated to establish connection between points C and B and the image from the system control unit 114 is displayed by the display unit 108 (step S121).

If the transmission capability is changed (step S122), and if it is changed by the own terminal, a transmission capability change instruction is given from the operation unit 113, and the system control unit 114 sends an in-channel BAS command to the partner's terminal through the multiplex/separation unit 115 to inform the partner's terminal of the change in the transmission capability while changing the capability of the own terminal. For example, the audio units are not started (step S111) if no voice is supplied, the data units are not started (step S113) if no data is supplied, and the video changeover unit 117 is operated to establish connection between terminals C and B to make the display unit 108 display the image prepared by the system control unit 114 (steps S115, S121) if no image is supplied. For example, the present transmission capability is displayed, thereby informing the operator that no image is transmitted. Alternatively, information transmitted through media other than animated images (drawings, still images, text data or the like) is transmitted and received as in-channel data and is converted into an image by the system control unit 114 to be displayed. A transmission capability change instruction from the partner's terminal is recognized by an in-channel BAS command from the partner, and the capability of the own terminal is changed as described above.

If a disconnection request is sent from the own terminal or the partner's terminal (step S123), the system control unit 114 makes the video changeover unit 117 establish connection between points C and B to display an image from the system control unit 114 by the display unit 108 (step S124). For example, a picture for informing the operator that the line will be disconnected or of the communication time is displayed. Thereafter, when the line is disconnected (step S125) and when the apparatus is ready for next communication, the system control unit 114 makes the display unit 108 display the initial picture.

In case of operation other than multi-media terminal communication and telephone communication, other terminal processings are performed (steps S101, S102, S126).

As described above, the multi-media terminal in accordance with the second embodiment of the present invention, having audio input/output means, video input/output means, data input/output means, display means and control means, is provided with a video changeover means for selecting one of a video signal received from the partner's terminal and a control video signal output from the control means and for outputting the selected signal to a video output unit of the video input/output means, and a sync detection means for detecting synchronization of the received video signal. The control means includes a means for recognizing a synchronous state or an asynchronous state of the received video signal based on a signal output from the sync detection means, and a means for making the video changeover means select the received video signal and display the same by the display means if a synchronous state is recognized during video data communication, and for making the video changeover means select the control video signal and display the same by the display means if an asynchronous state is recognized during video data communication. An asynchronous state of the received video signal is thereby recognized to be inhibit display of the image in a case where the image becomes discontinuous or disturbed by a line disorder, a disorder of the image reducing unit, an error in encoded data or the like. It is possible for the operator to avoid seeing a poor image, and the need for a manual picture changeover operation according to image disturbance or the like is eliminated.

While the image is discontinued or disturbed, an image prepared by the control means is automatically displayed on the screen according to the situation under disturbance and the like. It is thereby possible to give the operator visually detailed visual information by a message, such as "an image disturbance has occurred" or "the line is down" so that the operator can easily grasp the situation and, hence, to reduce the time for situation communication.

[Third Embodiment]

The third embodiment relates to details of the second embodiment. The construction of a multi-media terminal in accordance with the third embodiment is the same as that of the second embodiment shown in FIG. 4 and the description for it will not be repeated.

Figure 7:
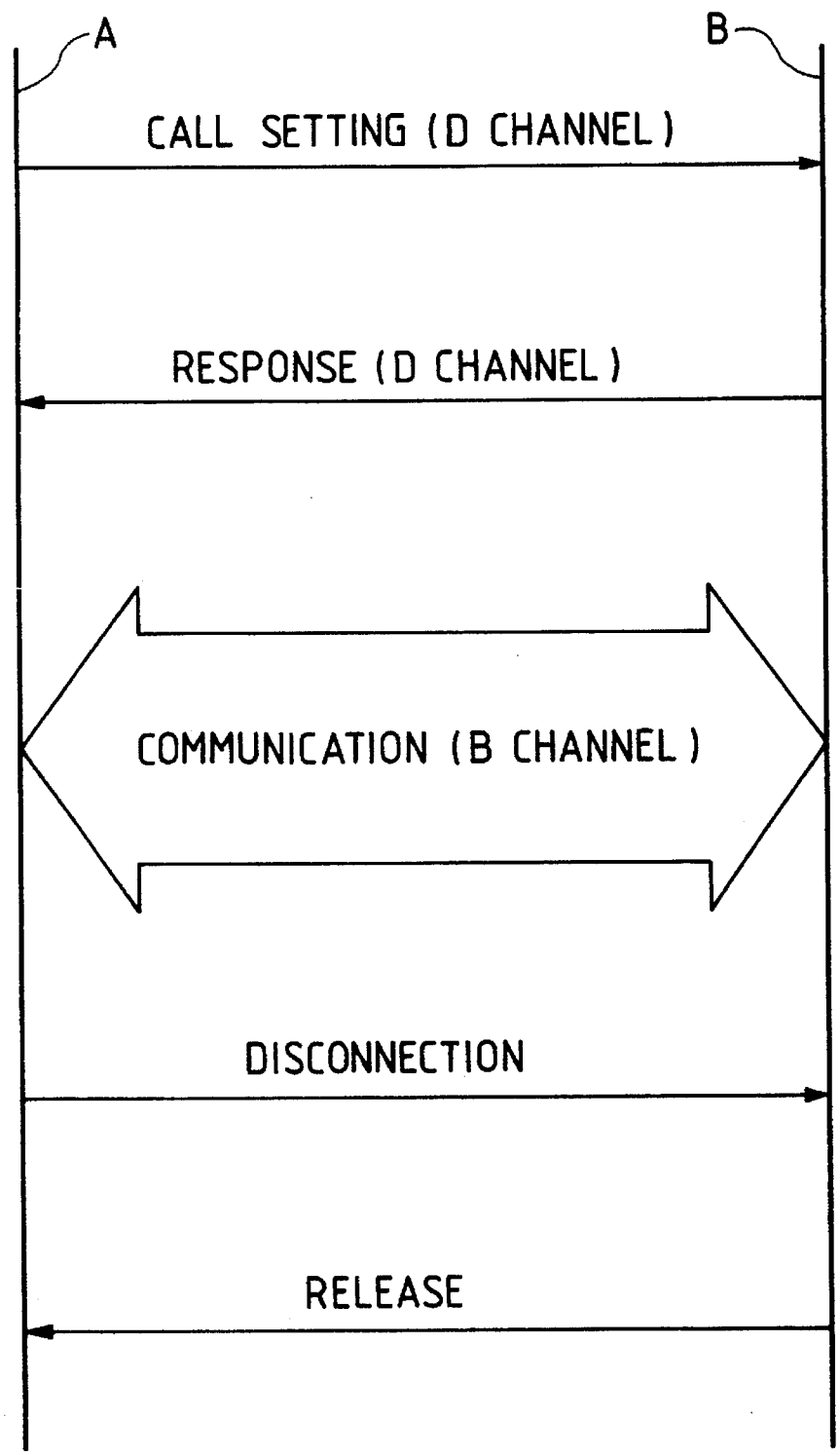
FIG. 7 is a sequential diagram of a channel D procedure.

First, a method of performing terminal capability negotiation and changing the terminal capability will be described below. In the case of communication through the ISDN line, calling is performed by using an out-band signal (i.e., through channel D) as shown in FIG. 7. Communication through channel B is enabled by call setting from terminal A to terminal B and response from terminal B to terminal A, as shown in FIG. 7. Other communication paths, channels D, H0, and H1 may be used but the description will hereinafter be made with respect to channel B alone.

Next, a channel B in-band signal procedure (in which channel B is separated into in-channels for data and control and the control channel is used for communication control). This control procedure is called in-channel control procedure, which term will be hereinafter used. For execution of this in-channel control, control bits are required in channel B, and the frame construction of them is prescribed in H.221.

This frame construction is shown in FIGS. 9A, 9B, and 9C. The multi-frame structure shown in FIGS. 9A to 9C are used at the time of channel B communication (64 kbps). This multi-frame structure is based on 1 octet/125 μsec and is defined by 1 frame=80 octets as shown in FIG. 9A, 1 sub-multi-frame=2 frames as shown in FIG. 9B, and 1 multi-frame=8 sub-multi-frames as shown in FIG. 9C. It is defined in the direction of bits by sub channels #1 to #8 of 8 kbps. With respect to sub channel #8 alone, the transfer rate is 6.4 kbps, and FAS (frame alignment signal) and BAS (bitrate allocation signal) are inserted as control bits. FAS and BAS enable in-channel control of channel B. FAS is used for frame and multi-frame synchronization. BAS is used for exchange of information on terminal capabilities or for capability setting necessary for determining a method of multiplexing sub channels. Specifically, BAS can be changed with respect to sub-multi-frames (20 msec) even during data communication. Octet data is transmitted in order of octet numbers.

Figure 8:
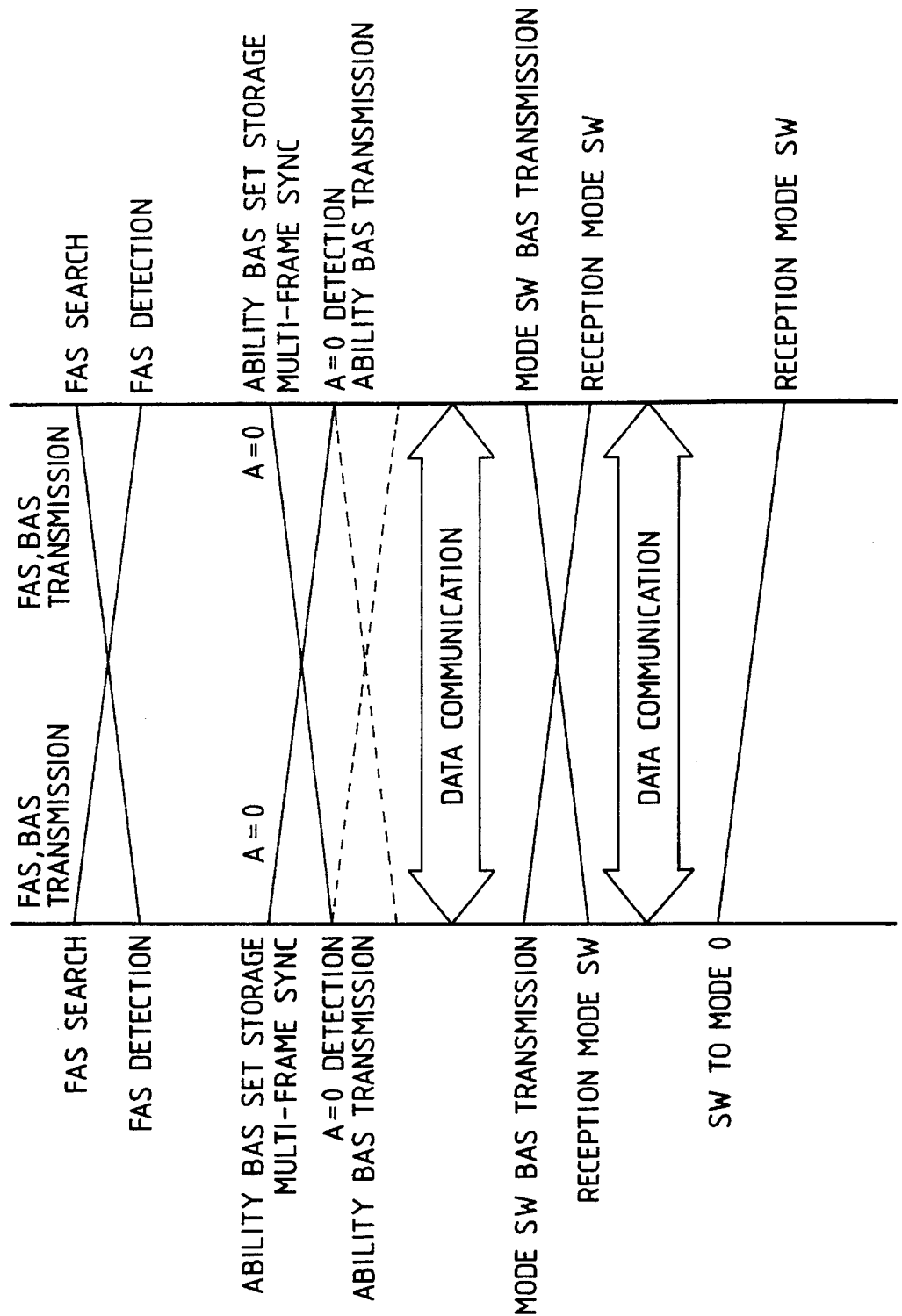
FIG. 8 is a sequential diagram of an in-channel control procedure.
Figure 12:
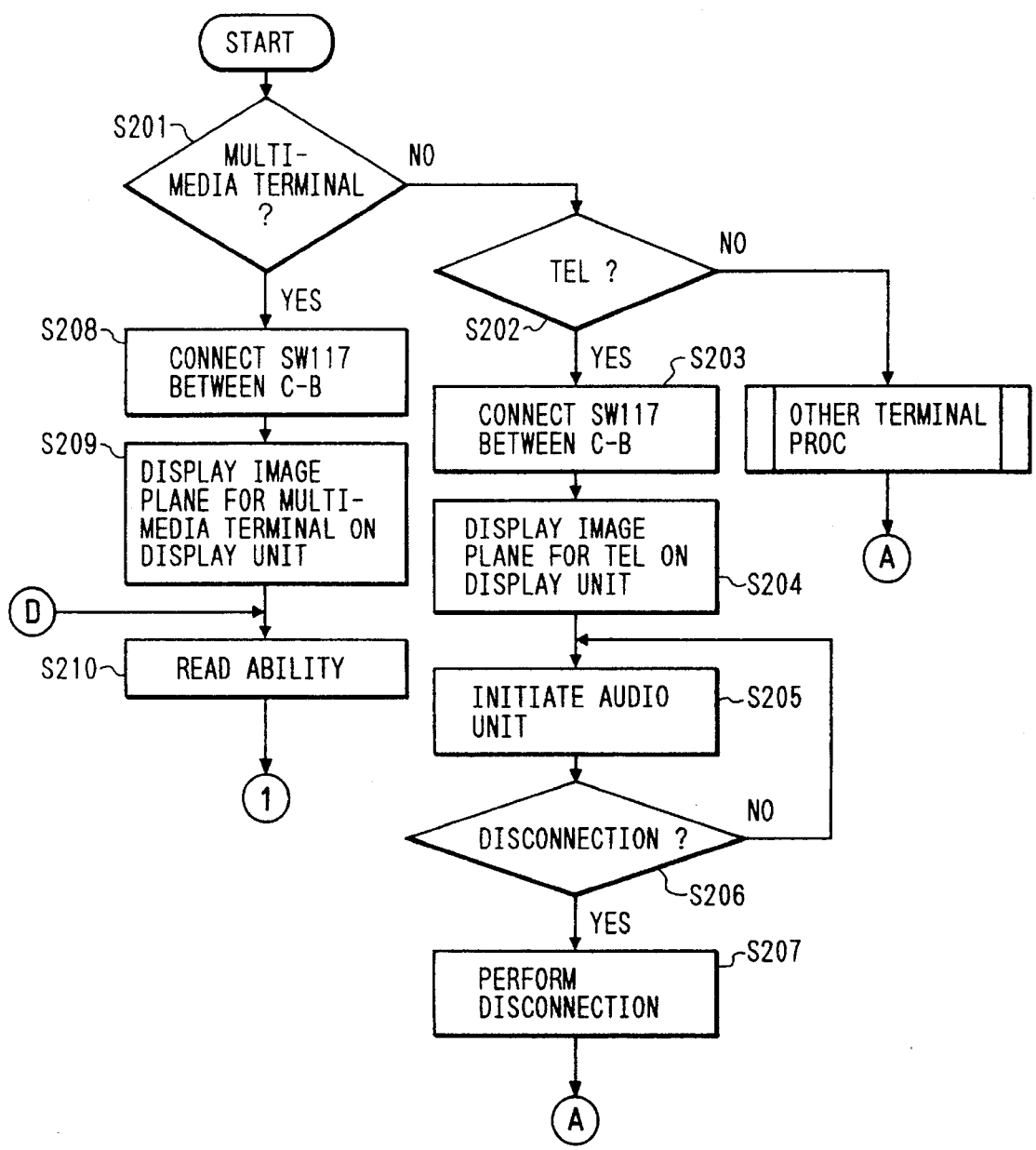
FIGS. 12 to 15 are flow charts of the operation of a multi-media terminal in accordance with the third embodiment of the present invention.
Figure 13:
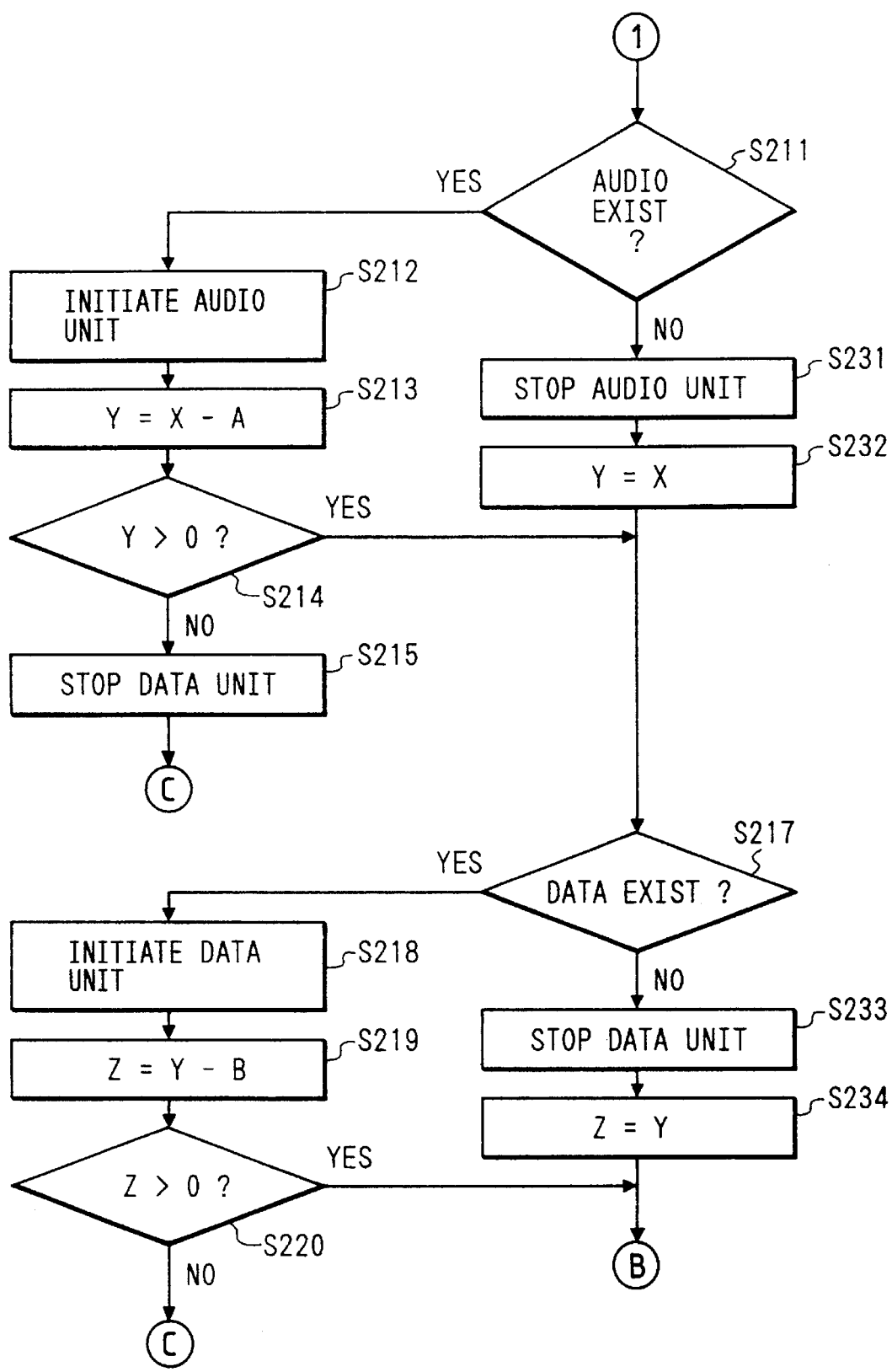
Figure 14:
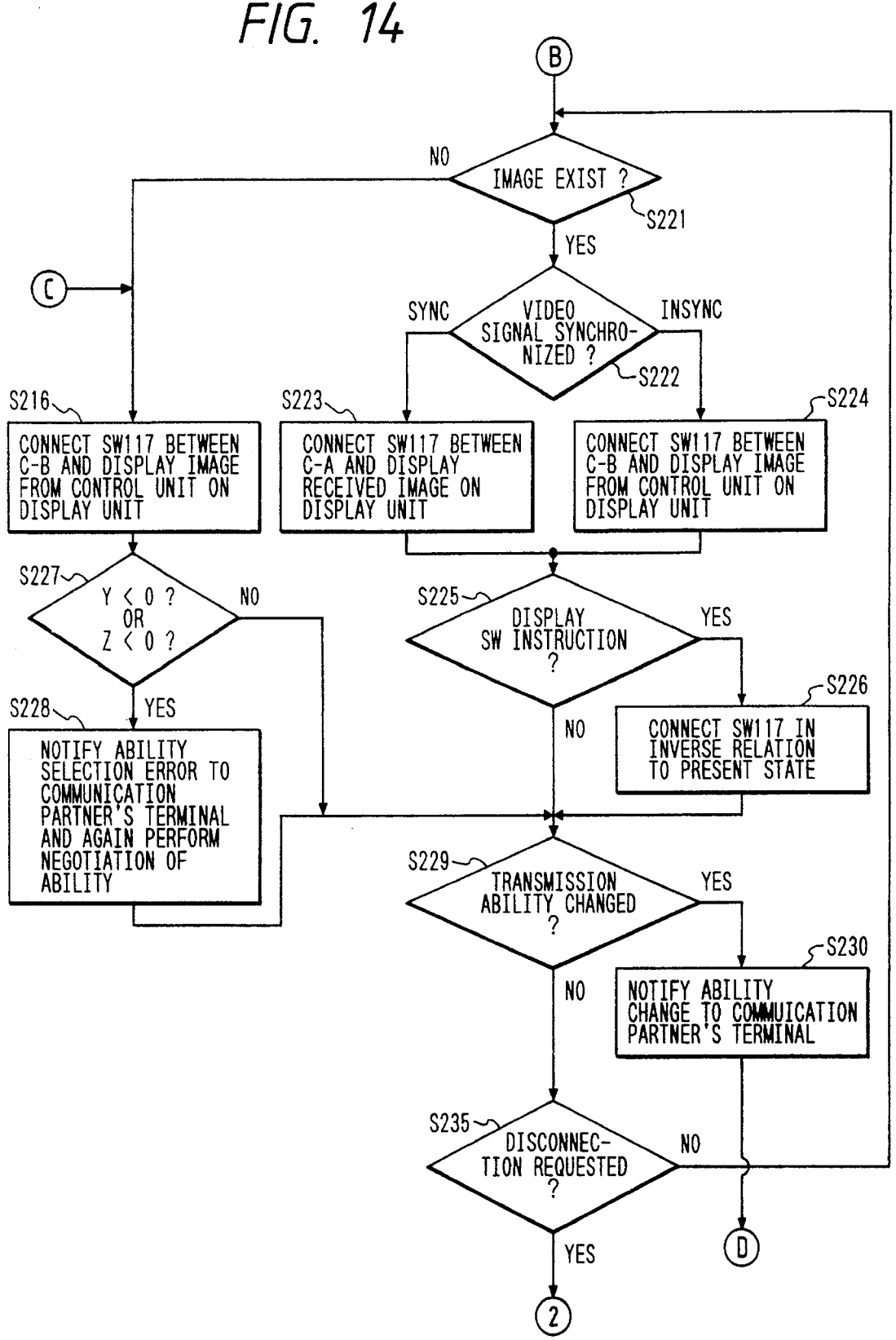
Figure 15:
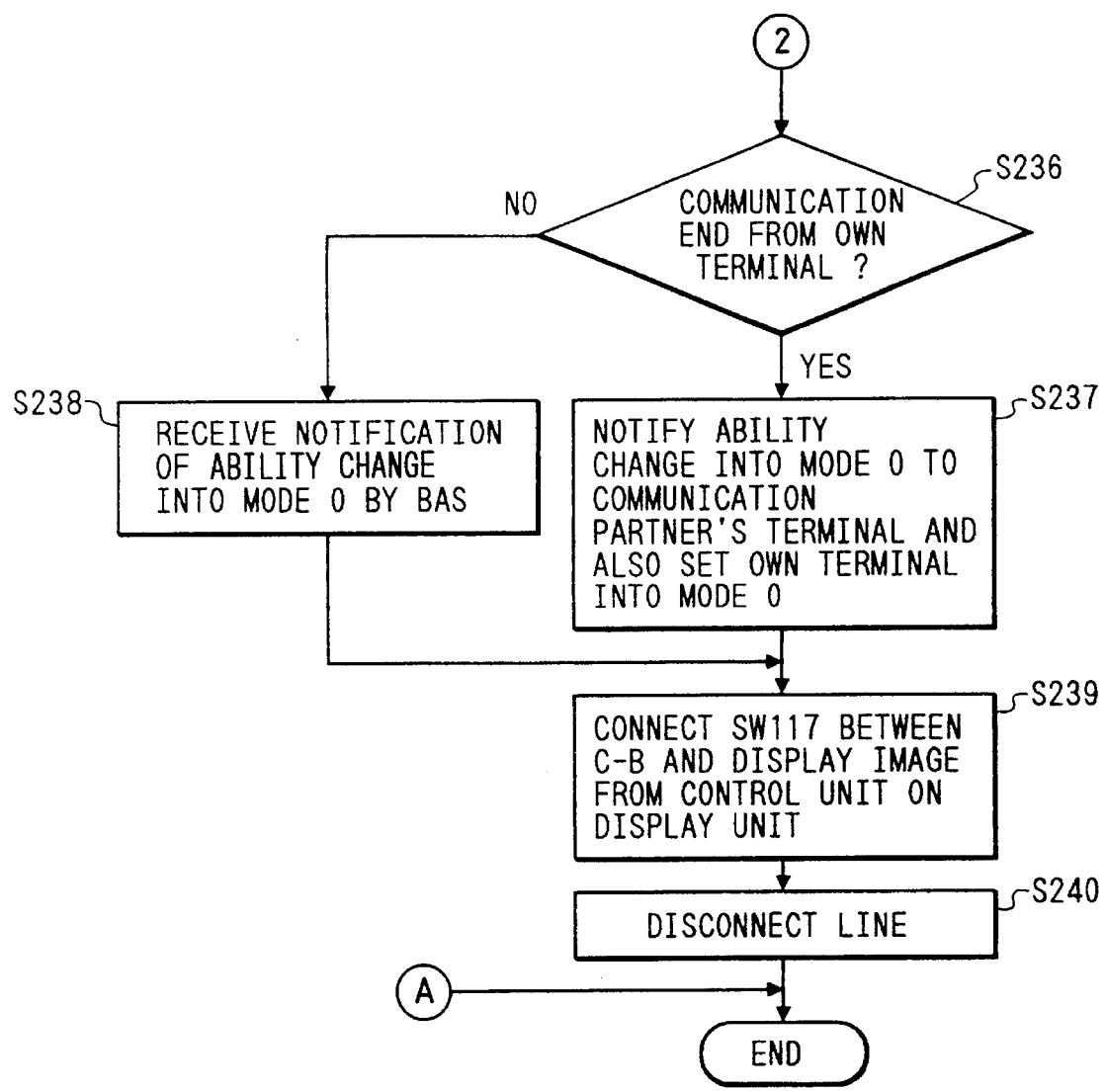

The procedure will be described below with reference to FIG. 8. When channel B becomes ready for communication, both terminals A and B transmit FAS. The terminal capability at this time is in mode 0 of initial state (mode of audio, FAS and BAS alone). This FAS is searched for by each partner's terminal. If the frame synchronization establish condition prescribed in H.242 is satisfied, FAS is transmitted after setting A in the bit construction of FAS shown in FIG. 10A to "0". When A=0 is received by each terminal, it is confirmed that frame synchronization on the partner's terminal has been established. Next, information on the capability of each terminal is transmitted to the partner's terminal by BAS (as indicated by the dotted lines in FIG. 8), so that the terminals recognize the partner's capabilities each other. If communication is possible between the terminals at this time, data communication is started. If a capability change is required, the terminal capability is transmitted in the same manner by using BAS as a command. After the partner's terminal has completed setting of its capability, data transmission is started. Transmission and reception for data communication are independent of each other, and establishment of synchronization and setting of terminal capabilities are also performed separately. Accordingly, there is a possibility of occurrence of an synchronization error with respect to one direction alone, or a possibility of the kinds of data differing with respect to transmission and reception. At the time of disconnection of call after completion of data communication, the disconnecting terminal (terminal A in the example shown in FIG. 8) sets the mode to 0 by using BAS, thereby returning the in-channel control of the channel B to the initial state.

Next, disconnection and release are effected by the channel B out-band procedure as shown in FIG. 7, thereby completing the whole communication process.

FIGS. 10A to 10C show the bit construction in FAS. Bit A indicates a frame synchronization error. Bit E indicates whether or not an CRC error has occurred. $C_1$, $C_2$, $C_3$, and $C_4$ are four bits of CRC. $N_1$ to $N_5$ are used to number multi-frames. R1 to R4 indicate channel numbers. TEA is used for a terminal alarm, and "1" is set if an input signal is received due to an internal malfunction of the terminal or if it is not possible to deal with this. "Service channel" shown in FIG. 10A denotes 8th sub channel shown in FIG. 9A.

FIGS. 11A and 11B show the internal bit construction of BAS. As shown in FIG. 11A, upper 3 bits represent attribution and the other 5 bits represent values of the attribution. FIG. 11B shows the content of the attribution. For example, as attribution values, a transfer rate value, a value indicating the kind of codec, and a parameter value peculiar to each medium are defined.

The FIGS. 12 to 15 show flows of the operation of the multi-media terminal in accordance with the third embodiment. First, determination is made as to whether communication is performed by a multi-media terminal or a telephone terminal (step S201). In the case of telephone communication, the video changeover unit (SW) 117 is operated to establish connection between points C and B (steps S202, S203). A telephone picture prepared by the system control unit 114 is displayed by the display unit 108 (step S204). For example, at the time of calling, a ten key cluster, a telephone directory and a telephone number input by keys are displayed, or at the time of call acceptance, the partner's telephone number, if the partner can be identified, and other information are displayed. During talking, the talking time and other information are displayed. The audio units (audio interface unit 104 and audio encode/decode unit 105) are started to continue operating until disconnection of call (steps S205 to S207).

In the case of communication by a multi-media terminal, the video changeover unit 117 is operated to establish connection between the points C and B (step S208) and a multi-media terminal picture prepared by the system control unit 114 is displayed by the display unit 108 (step S209). For example, at the time of calling, setting of a capability used for communication, a ten key cluster, a list of terminal numbers and a number input by keys, used as in the case of telephone communication, are displayed. At the time of call acceptance, the capability of the partner's terminal and the capability during transmission are displayed and the partner's terminal number is also displayed if it can be identified. After negotiation of capabilities using BAS (step S210), the audio units are started (steps S211, S212) if an audio capability is required. From a maintained channel B transfer rate X, a transfer rate A of the selected audio codec is subtracted (step S213), and the transfer rate thereby obtained is set as Y. If Y=0, it is determined that there are no data and no image (steps S214 and S215). Accordingly, in this case, the video changeover unit 117 is operated to establish connection between points C and B and an image from the system control unit 114 is displayed (step S216 of FIG. 14). For example, information transmitted through media other than animated images (drawings, still images, text data or the like) is transmitted and received as data and is converted into an image by the system control unit 114 to be displayed. If Y>0, the data interface unit (data unit) 112 is started (steps S217 and S218) if a data capability is required, the transfer rate B of the selected data is subtracted from the transfer rate Y, and the transfer rate thereby obtained is set as Z (step S219). If Z=0, it is determined that there is no image (step S220). Accordingly, in this case, the video changeover unit 117 is operated to establish connection between points C and B and an image from the system control unit 114 is displayed (step S216). If Z>0, the video changeover unit 117 is operated to establish connection between points C and B and an image from the system control unit 114 is displayed (steps S221, S216) if no video capability is required. If a video capability is required, the video units are started, the transfer rate Z is set as a video transfer rate, and the sync detection unit 118 detects whether or not the video signal is synchronized (step S222). When synchronization of the video signal is established, the system control unit 114 recognizes this state and make the vide changeover unit 117 establish connection between points C and A (step S223). A partner's image from the video encode unit 110b is transmitted to the video output unit 109 to be displayed by the display unit 108. If Y<0 or Z<0, information indicating that a capability selection error has occurred is transmitted to the partner's terminal, and the process proceeds to perform capability negotiation again (steps S227, S228). For example, a method of returning to the mode 0 and performing capability exchange again may be used. In case of a sync error, the video changeover unit 117 is operated to establish connection between points C and B and an image prepared by the system control unit 114 is displayed by the display unit 108 (step S224). For example, a message, such as "wait a moment", is displayed to inform the operator of the state of waiting for reception of the partner's image. If a display changeover instruction is supplied from the operation unit 113 by key input means or the like (step S225), the system control unit 114 makes the video changeover unit 117 change over to the switch position opposite to the present switch position (step S226). For example, if connection between points C and A has been maintained, the changeover unit 117 changes over for connection between points C and B, or if connection between points C and B has been maintained, the changeover unit 117 changes over for connection between points C and A.

Capability change during communication will be described below. In a case where the own terminal changes the capability (step S229), the system control unit 114 notifies the partner's terminal of capability change through the multiplex/separation unit 115 by channel B in-channel BAS in response to a transmission capability change instruction from the operation unit 113 (step S230). Simultaneously, according to the change in capability, the audio units, the data units, the video units (image input/output unit 109 and image encode/decode unit 110) and the video changeover unit 117 of the own terminal are changed (steps S211 to S234). In this case, a transfer rate A=0 is set if no voice is supplied, a transfer rate B=0 is set if no data is supplied, and the process proceeds to step S221 (steps S231 to S234. In case of capability change from the partner's terminal, a command in BAS is received and the audio units, the data units, the video and the video changeover unit 117 are changed according to this signal.

Termination of communication (step S235) will be described below. In a case where the termination procedure is started from the own terminal (step S236), the system control unit 114 notifies the partner's terminal of capability change to mode 0 through the multiplex/separation unit 115 by channel B in-channel BAS in response to an instruction from the operation unit 113 (step S237). Simultaneously, the own terminal is set to mode 0 (step S237), the system control unit 114 makes the video changeover unit 117 establish connection between points C and B, and an image from the system control unit 114 is displayed by the display unit (step S239). For example, the operator is thereby informed that the line will be disconnected. Thereafter, a disconnection signal is transmitted from the own terminal (step S240), and a release signal is received from the partner's terminal, thereby terminating communication. At this time, the communication time and the communication charge are displayed. When the terminal is ready for next communication, the initial picture is displayed again. In a case where the termination procedure is started from the partner's terminal (step S236), a notification indicating capability change to mode 0 is received by BAS (step S238), the system control unit 114 makes the video changeover unit 117 establish connection between points C and B (step S239), and an image from the system control unit 114 is displayed by the display unit. For example, the operator is thereby informed that the line will be disconnected. When the line is disconnected (step S240) and when preparation for next communication has been completed, the initial picture from the system control unit 114 is displayed by the display unit.

As described above, the multi-media terminal in accordance with the third embodiment of the present invention, having audio input/output means, video input/output means, and data input/output means, is provided with a video changeover unit for selecting one of a video signal received from the partner's terminal and a control video signal output from the control unit for controlling the own terminal and for outputting the selected signal to the video output unit. The control unit includes a means for making the video changeover unit select the received video signal and display the same through the display unit if it is determined that the communication data contains image data, or making the video changeover unit select the control video signal and display the same through the display unit if it is determined that the communication data contains no image data, thereby enabling recognition of whether image data is contained in the data received from the partner's terminal. It is thereby possible to automatically change images displayed by the display unit, i.e., the received image and the image from the system control unit. The need for a troublesome operation of manually changing the pictures by monitoring on the display screen is thereby eliminated and the man-machine interface facility can be improved.

If there is no received image, an image from the system control unit is displayed on the screen, and the operator can be visually informed that the partner's terminal has changed the data transmission capability and that image data is not supplied, and can therefore grasp the situation easily and correctly.

Thus, in accordance with the third embodiment of the present invention, if there is a received image, this image is displayed, or if there is no received image, an image from the system control unit is displayed to facilitate grasping the situation and to prevent display of a meaningless image or a disturbed image.

[Fourth Embodiment]

An arrangement in accordance with the fourth embodiment will be described below in which a memory for storing a received image is provided, the image stored in the memory is displayed when a synchronization error occurs or during the time for recovery from the error, and the received image is displayed again after synchronization recovery so that the received image can be continuously displayed before and after synchronization recovery.

Figure 16:
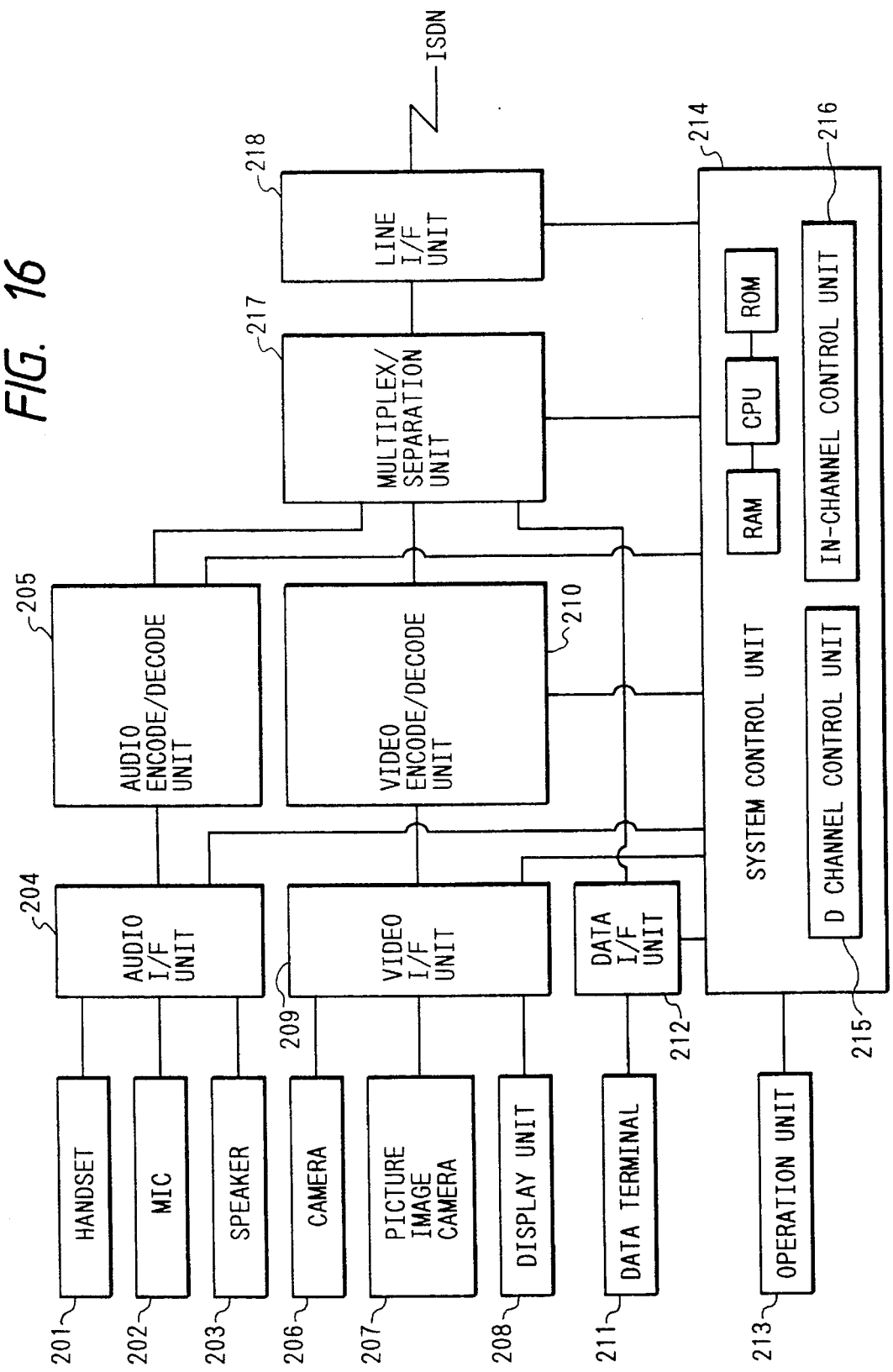
FIG. 16 is a block diagram of a multi-media communication apparatus in accordance with a fourth embodiment of the present invention.

FIG. 16 is a block diagram of a multi-media communication apparatus in accordance with the fourth embodiment of the present invention. The multi-media communication apparatus has a handset 201 provided as an audio input/output means, a microphone 202 provided as an audio input means, and a speaker 203 provided as an audio output means. The handset 201, the microphone 202 and the speaker 203 are connected to an audio interface unit 204. The audio interface unit 204 is instructed by a later-described system control unit 214 to perform each of various kinds of processing including changeover processing for changing the operations of the handset 201, the microphone 202 and the speaker 203 provided as audio input/output means, on/off-hook detection processing for detecting whether the handset 201 is in an on-hook state or an off-hook state, echo cancel processing for cancelling echoes when the microphone 202 and the speaker 203 provided as audio input/output means are operated, and processing for generating tones such as a dial tone, a call tone, a busy tone and an incoming tone. The audio interface unit 204 is connected to an audio encode/decode unit 205. The audio encode/decode unit 205 is instructed by the system control unit 214 to encode a voice signal to be transmitted or to decode a received voice signal in accordance with algorisms for encoding/decoding voice signals of 64 kbps PCM A-law, 64 kbps PCM μ-law, 64/56/48 kbps SB-ADPCM, 32 kbps ADPCM, 16 kbps (e.g., APC-AB), 8 kbps, and the like. A camera 206 is provided as an image input means to input a self-portrait image and the like, and a picture image camera 207 is provided as another image input means to input pictures, drawings and the like. An image display unit 208 serves to display an image input through the camera 206 or the picture image camera 207, an image received from the communication partner, an operation picture and the like. The camera 206, the picture image camera 207 and the image display unit 208 are connected to a video interface unit 209. The video interface unit 209 is instructed by the system control unit 214 to perform processing for changing the image input means, processing for changing input and received images and operation pictures to be displayed by the image display unit 108, image signal composition processing for displaying these images by dividing the picture on the display 208, and other kinds of processing. The video interface unit 209 is connected to a video encode/decode unit 210 which encodes transmitted image signals and decodes received image signals in accordance with the CCITT recommendation draft H.261. A data terminal 211 for performing data communication is connected to a data interface unit 212. The data interface unit 212 sends transmitted data supplied from the data terminal 211 and the system control unit 214 to a later-described multiplex/separation unit 217, and sends received data to the data terminal 211 or the system control unit 214. An operation unit 213 including a keyboard, a touch panel or the like used to input control information for overall control of the apparatus is connected the system control unit 214 together with the audio interface unit 204, the video encode/decode unit 210 and the data interface unit 212. The system control unit 214 has a CPU, a ROM, a RAM, an auxiliary memory and other components. The system control unit 214 monitors the conditions of the other units of the apparatus to effect overall control of the apparatus, forms operation/display pictures according to the conditions, executes application programs and performs other operations. The system control unit 214 has a channel D control unit 215 for performing call control and an in-channel control unit 216 for performing in-channel control. The audio encode/decode unit 205, the video encode/decode unit 210 and the data interface unit 212 are connected to the multiplex/separation unit 217. The multiplex/separation unit 217 multiplexes a voice signal from the audio encode/decode unit 205, an image signal from the video encode/decode unit 210, data from the data interface unit 212 and BAS from the system control unit 214 with respect to transmitted frames in accordance with the CCITT recommendation H.221, separates a received frame with respect to each of media constituting the frame and sends separated data to the relating units. The multiplex/separation unit 217 is connected to the system control unit 214 and a line interface unit 218 which controls the line based on the ISDN user network interface.

Figure 17:
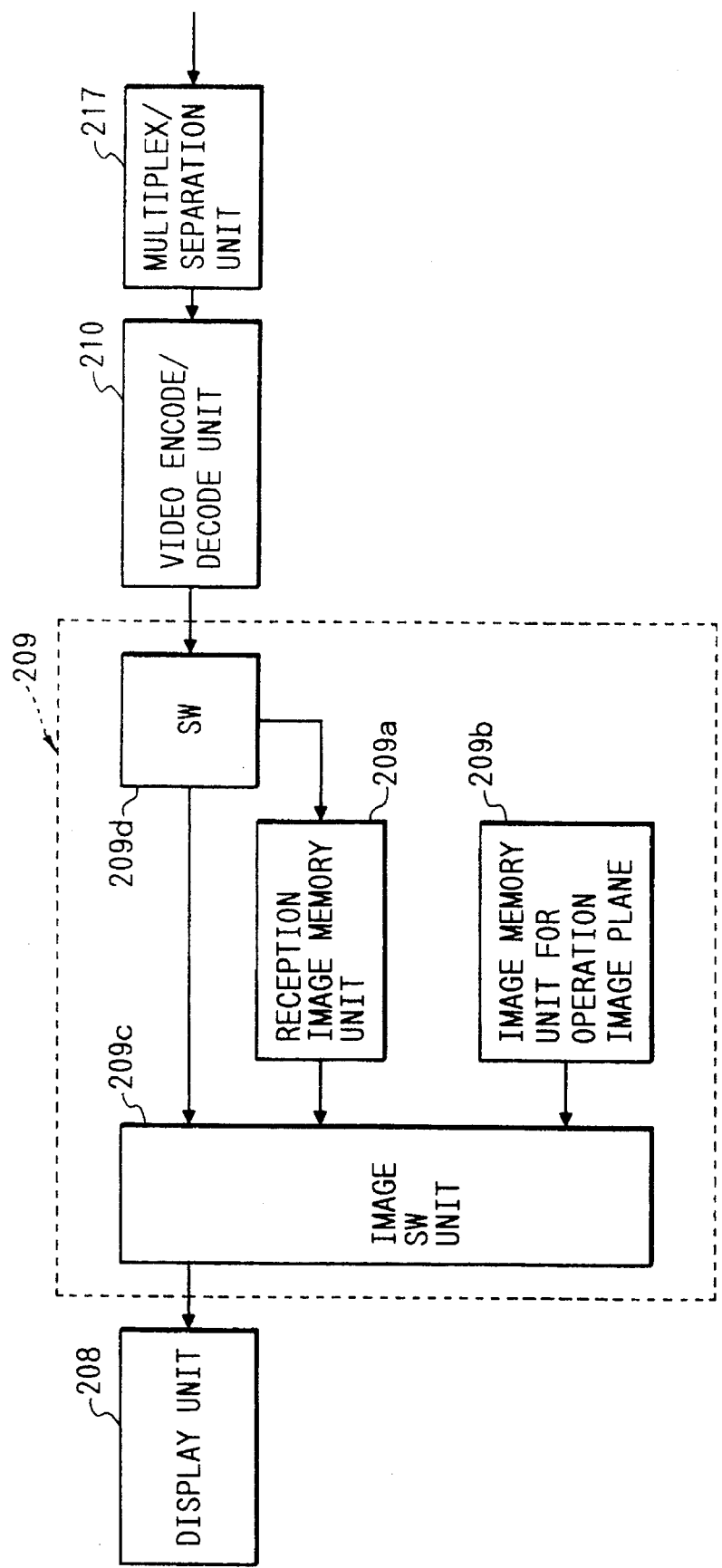
FIG. 17 is a detailed block diagram of the construction of the video interface unit and image data flows in accordance with the fourth embodiment.

FIG. 17 is a detailed block diagram of the construction of essential components of the video interface unit 209 and flows of image data output to the image display unit 208 in accordance with this embodiment. As is clear from FIG. 17, the video interface unit 209 comprises a received image memory unit 209a, an operation picture image memory unit 209b, an image SW unit 209d, and a switch (SW) 209d. The received image memory unit 209a stores images output from the video encode/decode unit 210 in constant number of frames. The operation picture image memory unit 209b stores operation pictures. The image SW unit 209c changes an image from the video encode/decode unit 210, an image from the received image memory unit 209a and an image from the operation picture image memory unit 209b by instructions from the system control unit 214 to output the desired image to the image display unit 208. The switch 209d alternatively changes the image output from the video encode/decode unit 210 between a state of being input to the received image memory unit 209a and a state of being not input to this memory.

Figure 18:
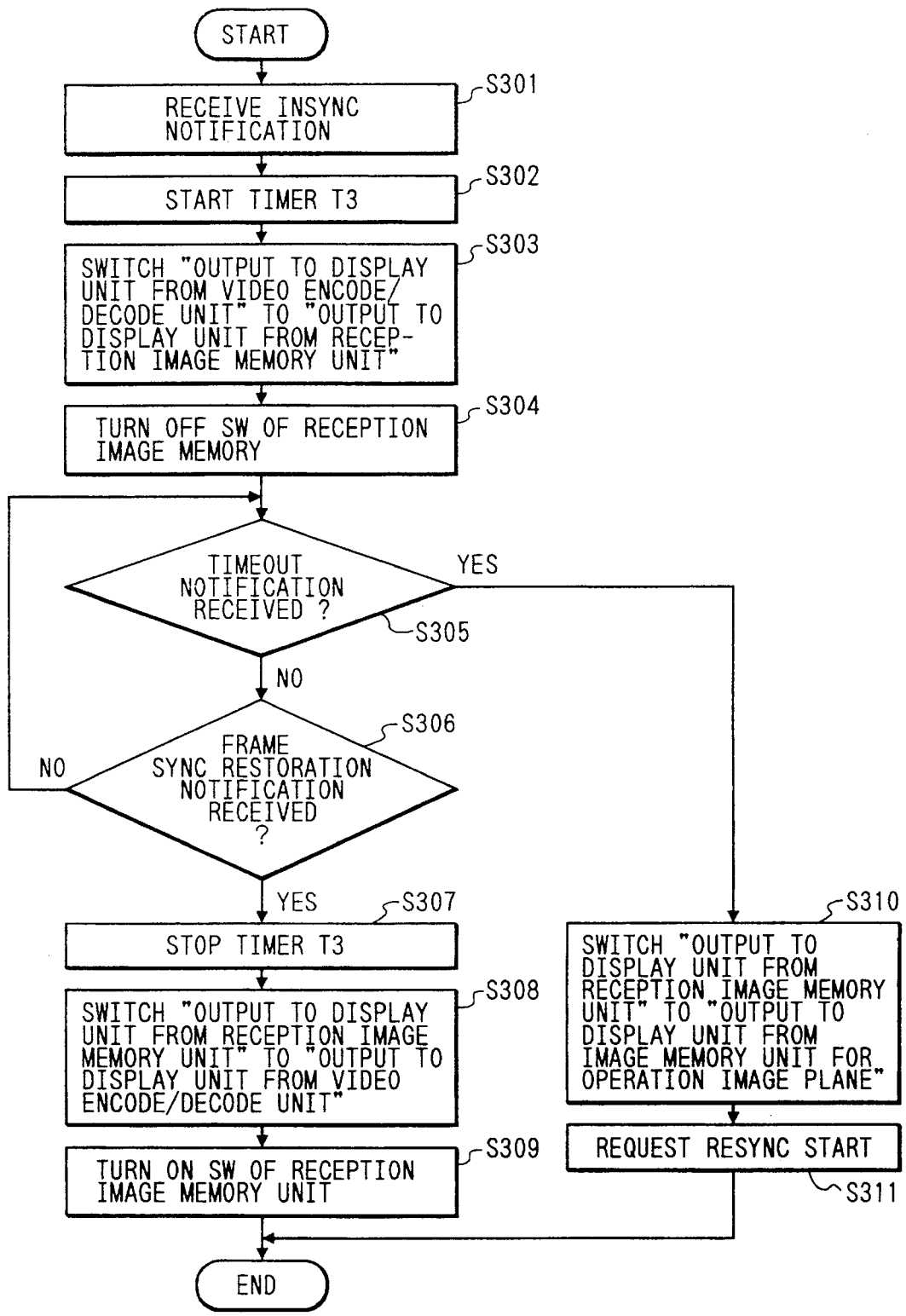
FIG. 18 is a flow chart of the operation procedure of the apparatus of the fourth embodiment.

The operation of the multi-media communication apparatus in accordance with this embodiment will be described below with reference to the flow chart of FIG. 18.

If a fame synchronization error occurs during image data communication with a partner's terminal, the multiplex/separation unit 217 informs the system control unit 214 of the occurrence of this error (step S301). Next, in step S302, timer T3 (10 sec) is started. This timer value of 10 seconds is prescribed in the CCITT recommendation H.242. Then, the input to the image SW unit 209c, which is supplied form the video encode/decode unit 210 and output to the image display unit 208 during ordinary operation, is changed to the input from the received image memory unit 209a (step S303). Next, the image data input from the video encode/decode unit 210, which is stored in the received image memory unit 209a during ordinary operation, is stopped from being stored, that is, the switch 209d is turned off to prevent storage of image data influenced by the synchronization error (step S304). If synchronization recovery of the multiplex/separation unit 217 is not completed 10 seconds after the start of the timer in step S302, the operation of timer T3 is terminated and the system control unit 214 receives timer T3 termination (time out) notification, and examination is made as to whether or not this notification has been received (step S305). If this timer T3 termination notification is not received, the process proceeds to step S306. If no timer T3 termination notification is received, the process proceeds to step S310.

If a frame synchronization error occurs, the multiplex/separation unit 217 performs a frame synchronization recovery operation and, after the completion of frame synchronization recovery, notifies the system control unit 214 of the frame synchronization recovery. In step S306, examination is made as to whether or not this notification has been received by the system control unit 214. If NO, step S305 is executed until the notification is received. When the frame synchronization recovery notification is received by the system control unit 214, timer T3 is stopped (step S307), and the input to the image SW unit 209c is changed to the input from the video encode/decode unit 210 to display a received image by the image display unit 208 (step S308). Thereafter, the switch 209d is turned on to start storing the received image in the received image memory unit 209b (step S309), thereby completing the control process.

If in step S305 the system control unit 214 receives the timer T3 termination notification, the input to the image SW unit 209c is changed to the input from the operation picture image memory 209b. An image for informing the user that a resynchronization procedure is started is displayed by the image display unit 208. In step S311, the system control unit 214 requests the multiplex/separation unit 217 to start resynchronization, and the multiplex/separation unit 217 thereby starts the resynchronization procedure, thus completing the control process.

The embodiment has been described with respect to processing in a case where a frame synchronization error occurs. However, the present invention can also be applied to processing in a case where an error such that the image is temporality disturbed, e.g., an image codec decode error, occurs.

As described above, in the multi-medial communication apparatus in accordance with the fourth embodiment of the present invention, if a frame synchronization error occurs during image data reception, display of a disturbed image is inhibited. During frame synchronization recovery, the image before the occurrence of the frame synchronization error is displayed, thereby preventing occurrence of discontinuity between the image before the occurrence of the frame synchronization error and the image after the frame synchronization recovery.

If the synchronization error is not recovered in a certain length of time, the displayed picture is changed to a control picture indicating that the synchronization error recovery process is proceeding, thereby enabling the operator to easily recognize the condition of the apparatus.

[Fifth Embodiment]

In the above-described embodiments, synchronization error notification is effected by means of an image. An arrangement in which synchronization error notification is effected by means of image or voice, or both image and voice according to the media used in the apparatus will be described below.

Figure 19:
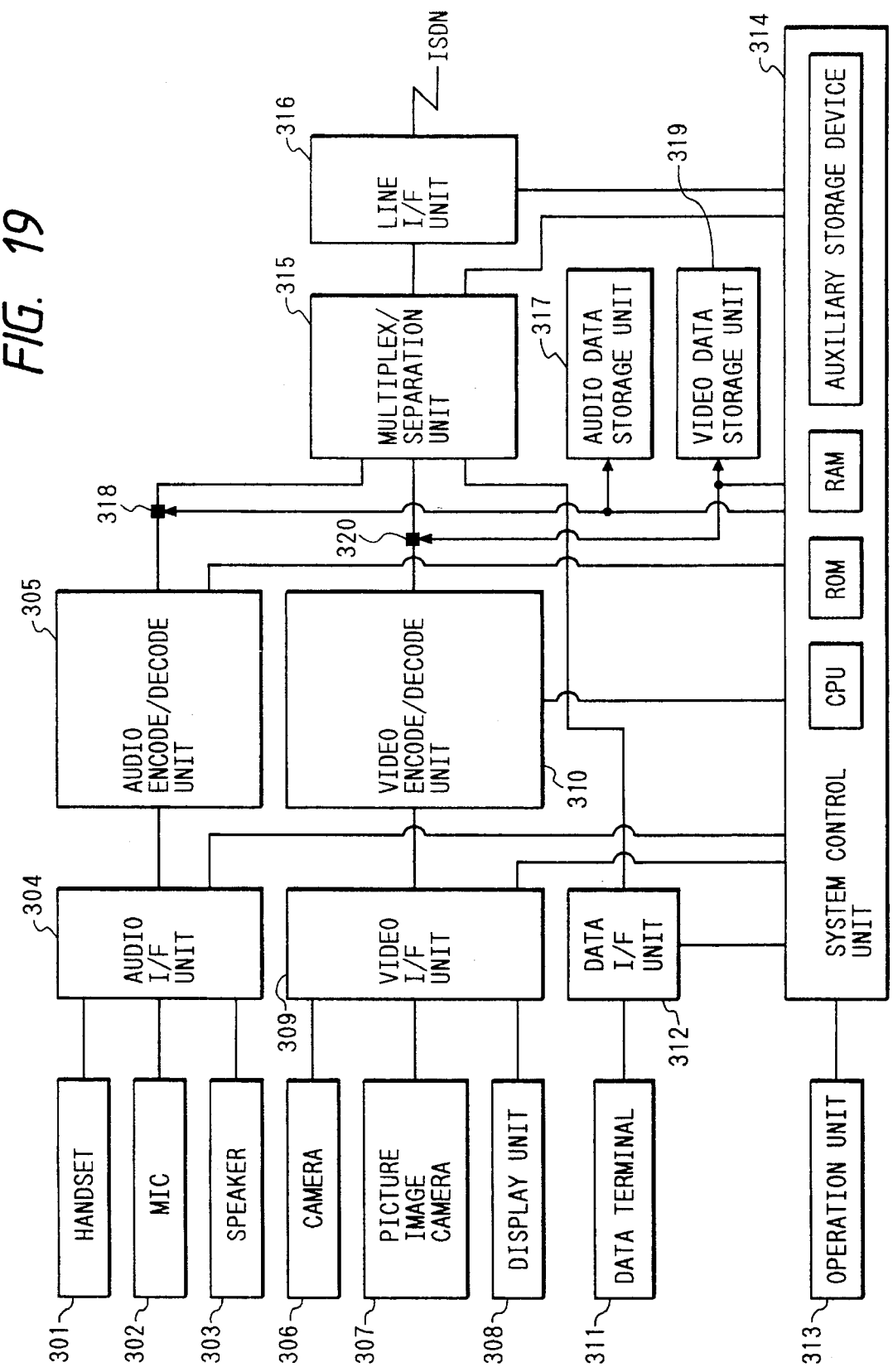
FIG. 19 is a block diagram of a multi-media communication apparatus in accordance with a fifth embodiment of the present invention.

FIG. 19 is a block diagram of a multi-media communication apparatus in accordance with the fifth embodiment of the present invention. The multi-media communication apparatus has a handset 301 provided as an audio input/output means, a microphone 302 provided as an audio input means, and a speaker 303 provided as an audio output means. An audio interface unit 304 is instructed by a system control unit 314 to perform each of various kinds of processing including changeover processing for changing the operations of the handset 301, the microphone 302 and the speaker 303 provided as audio input/output means, on/off-hook detection processing for detecting whether the handset 301 is in an on-hook state or an off-hook state, echo cancel processing for cancelling echoes when the microphone 302 and the speaker 303 provided as audio input/output means are operated, and processing for generating tones such as a dial tone, a call tone, a busy tone and an incoming tone. An audio encode/decode unit 305 is instructed by the system control unit 314 to encode a voice signal to be transmitted or to decode a received voice signal in accordance with algorisms for encoding/decoding voice signals of 64 kbps PCM A-law, 64 kbps PCM μ-law, 64/56/48 kbps SB-AD-PCM, 32 kbps ADPCM, 16 kbps (e.g., APCAB), 8 kbps, and the like. A camera 306 is provided as an image input means to input a self-portrait image and the like, and a picture image camera 307 is provided as another image input means to input pictures, drawings and the like. A display unit 308 serves to display an image input through the camera 306 or the picture image camera 307, an image received from the communication partner, an operation picture and the like. A video interface unit 309 is instructed by the system control unit 314 to perform processing for changing the image input means, processing for changing input and received images and operation pictures, image signal composition processing for displaying these images by dividing the frame on the display 308, and other kinds of processing. A video encode/decode unit 310 encodes transmitted image signals and decodes received image signals in accordance with the CCITT recommendation draft H.261. A data terminal 311 serves to perform data communication. A data interface unit 312 sends transmitted data supplied from the data terminal 311 and the system control unit 314 to a multiplex/separation unit 315, and sends received data to the data terminal 311 or the system control unit 314. An operation unit 313 includes a keyboard, a touch panel or the like used to input control information for overall control of the apparatus. The system control unit 314 has a CPU, a ROM, a RAM, an auxiliary memory and other components. The system control unit 314 monitors the conditions of the other units of the apparatus to effect overall control of the apparatus, forms operation/display pictures according to the conditions, executes application programs and performs other operations. The multiplex/separation unit 315 operates in accordance with the CCITT recommendation H.221 to establish frame synchronization on a set channel, to convert a voice signal from the audio encode/decode unit 305, an image signal from the video encode/decode unit 310, data from the data interface unit 312 and a control command from the system control unit 314 into BAS, to multiplex these signals with respect to transmitted frames, to separate a received frame with respect to each of media constituting the frame and to send separated data to the relating units. A line interface unit 316 controls the line based on the ISDN user network interface by exchange of commands with the system control unit 314. An audio data storage unit 317 serves to generate a disorder notification sound or speech by an instruction from the system control unit 314 if an error such as a transmission error or a frame error is detected in the multiplex/separation unit 315. The disorder notification sound or speech stored in the audio data storage unit 317 is input through the handset 310 or the microphone 302. A switch 318 serves to change over by an instruction from the system control unit 314 to determine which of the received audio data from the multiplex/separation unit 315 and the audio data from the audio data storage unit 317 is transmitted to the audio encode/decode unit 305. A video data storage unit 319 serves to generate a disorder notification image by an instruction from the system control unit 314 if an error such as a transmission error or a frame error is detected in the multiplex/separation unit 315. The disorder notification image stored in the video data storage unit 319 is input through the camera 6 or the picture image camera 7. A switch 320 serves to change over by an instruction from the system control unit 314 to determine which of the received video data from the multiplex/separation unit 315 and the video data from the video data storage unit 319 is transmitted to the video encode/decode unit 310.

Figure 20:
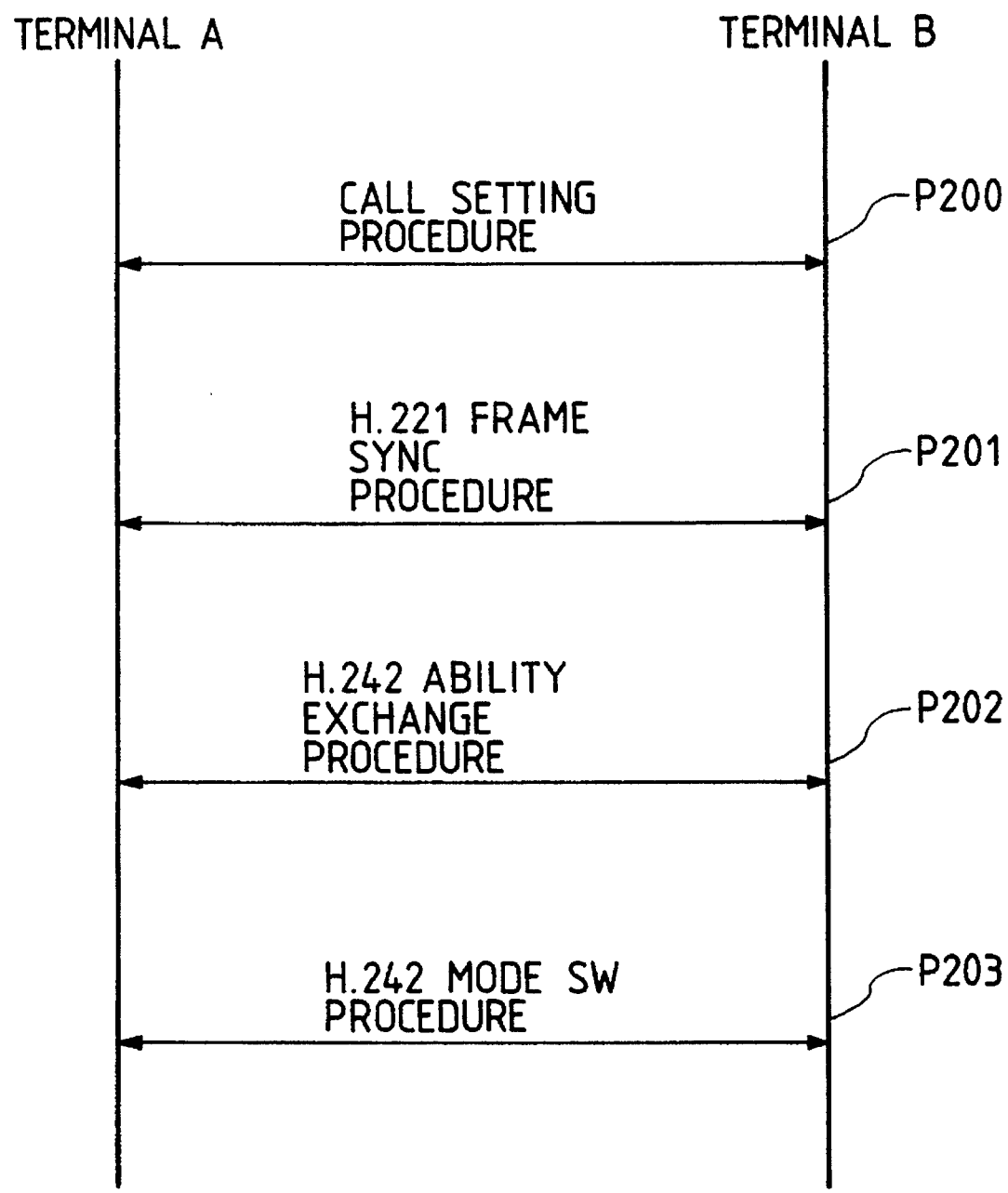
FIG. 20 is a sequential diagram of a communication start procedure.

FIG. 20 is a sequential diagram of an AV (audio and visual) communication start procedure. A call setting procedure is executed on a D channel according to an ISDN user interface so as to start a communication (procedure P200). Then, a frame synchronization procedure is executed on a set B channel according to the recommendation H.221 (procedure P201). If a frame synchronization is established, an ability exchange procedure using the BAS code is executed according to the recommendation H.242 (procedure P202). A range to which the exchanged own ability and partner's ability are suitable is rendered as a communication capable ability in the communication. After the ability exchange, a mode switch (changeover) procedure using the BAS code is executed according to the recommendation H.242 so as to designate the communication mode in which the communication is actually performed, within the range of communication capable ability (procedure P203), whereby the AV communication can be performed.

FIG. 21 is a flow chart of a control process conducted by the system control unit 314 when a command is received from the multiplex/separation unit 315. The operation of this embodiment will be described below with reference to this flow chart.

In step S400, determination is made as to whether or not a command received from the multiplex/separation unit 315 is an error notification. If the command is an error notification, the process proceeds to step S402. If the command is not an error notification, the process proceeds to step S401. In step S401, processing is performed in accordance with a command other than the error command, and the process is terminated. In step S402, determination is made as to whether the content of the error notification indicates error occurrence or error recovery. The process proceeds to step S403 in case of error occurrence, or to step S409 in case of error recovery. In step S403, determination is made from the present partner communication mode as to whether or not audio data is being received. The process proceeds to step S404 if Yes, or to step S406 if No. In step S404, the audio data changeover switch 318 is changed over so that the audio data from the audio data storage unit 317 is transmitted to the audio encode/decode unit 305. In step S405, the disorder notification audio data storage unit 317 is instructed to start sending data. In step S406, determination is made from the present partner communication mode as to whether or not video data is being received. The process proceeds to step S407 if Yes, or the process is terminated if No. In step S407, the video data changeover switch 320 is changed over so that the video data from the video data storage unit 319 is transmitted to the video encode/decode unit 310. In step S408, the disorder notification video data storage unit 319 is instructed to start sending data, and the process is terminated.

If an error occurs, the multiplex/separation unit 315 executes an error recovery process. After completion of the error recovery process, the multiplex/separation unit 315 sends a command to the system control unit 314 to notify the same of the completion of the process. When the system control unit 314 receives the recovery command, it forwards the process to step S409. In step S409, determination is made from the state of the audio data changeover switch 319 as to whether or not audio data from the audio data storage unit 317 is transmitted to the audio encode/decode unit 305. The process proceeds to step S410 if Yes, or to step S412 if No. In step S410, the audio data changeover switch 318 is changed over so that the audio data from the multiplex/separation unit 315 is transmitted to the audio encode/decode unit 305. In step S411, the disorder notification audio data storage unit 317 is instructed to stop sending data. In step S412, determination is made from the state of the video data changeover switch 320 as to whether or not video data from the video data storage unit 319 is transmitted to the video encode/decode unit 310. The process proceeds to step S413 if Yes, or is terminated if No. In step S413, the video data changeover switch 320 is changed over so that the video data from the multiplex/separation unit 315 is transmitted to the video encode/decode unit 310. In step S414, the disorder notification video data storage unit 39 is instructed to stop sending data, and the process is terminated.

In this embodiment, when a disorder occurs, disorder occurrence notification is effected through the media used for communication before the occurrence of the disorder. For example, in a case where communication using audio data alone has been performed before the occurrence or a disorder, notification using only a sound or speech is effected at the time of occurrence of the disorder, and in a case where communication using audio and video data has been performed, notification using both a sound and an image is effected. This embodiment therefore enables a disorder notification to be easily understood by the operator.

In the above-described embodiment, a sound or speech for disorder notification is input the through the corresponding input unit. However, it may be previously stored in a ROM at the time of manufacture.

Disorder notification may be effected after timer observation for a certain length of time instead of being effected immediately after the occurrence of a disorder.

In accordance with the fifth embodiment of the present invention, as described above, an image, a sound or a speech for disorder notification previously stored is used to inform the operator of a disorder when the disorder occurs, and occurrence of a non-image or non-sound state is prevented, thereby enabling the operator to be suitably informed of the condition of the communication apparatus at the time of occurrence of a disorder.

The present invention has been described with respect to what are presently considered to be the preferred embodiments. However, it is to be understood that the invention is not limited to the disclosed embodiments, and that the present invention is intended to cover various modifications and equivalent arrangements included within the scope of the appended claims.

What is claimed is:
1. A user-interactive system for performing communication between a first user's data communication apparatus and a second user's communication apparatus connected thereto via a communication line, said system comprising:
reception means for receiving images sent from the second user's communication apparatus via the communication line;
error detection means for detecting synchronization of the received images and for detecting generation of an error;
image detection means for detecting whether or not said reception means has received the image;
an image memory in which a first control image for giving notice of an error generation and a second control image for giving notice that the image is not received have been previously stored;
display means for displaying an image; and
supply means for selectively supplying one of the images received by said reception means and the first and second control images stored in said image memory to said display means,
wherein said supply means selectively supplies the one received image and the first and second control images according to detection results output from said error detection means and said image detection means, such that said supply means supplies the one received image to said display means when said error detection means does not detect an error generation and supplies the first control image to said display means when said error detection means detects an error generation, and supplies the second control image to said display means when said image detection means detects that the image is not received.

2. A data communication apparatus according to claim 1, wherein said data communication apparatus comprises a multi-media communication apparatus for performing communication through voice, image and data media.

3. A data communication apparatus according to claim 1, wherein said data communication apparatus is connected to an integrated service digital network.

4. A data communication apparatus according to claim 1, further comprising synchronization detection means for detecting synchronization of the image used for communication by said first communication means, said supply means supplying the control image to said display means if an asynchronous state of the communication image is detected.

5. A user-interactive system for performing communication between a first user's multi-media communication apparatus and a second user's communication apparatus connected thereto via a communication line, said system comprising:
first communication means for communicating with the second user's communication apparatus by using image information sent via the communication line;
second communication means for communicating with the second user's communication apparatus by using voice and data information sent via the communication line;
an image memory in which a control image for giving notice that a communication of the image data is not being performed has been previously stored;
display means for displaying an image;
discrimination means for discriminating if communication of an image is being performed by said first communication means; and selection means for selectively supplying said display means with the image used for communication or the control image, wherein said selection means supplies the image being communicated by said first communication means to said display means when said determination means determines that communication of the image is being performed, and supplies the control image to said display means when said determination means determines that communication of an image is not being performed, wherein said first user's communication apparatus and the second user's communication apparatus perform a pre-procedure to determine a first amount of information that can be communicated therebetween, and wherein said discrimination means subtracts a second amount of information that is required for communication performed by said second communication means from the first amount of information, and said discrimination means determines that image communication is not performed if a remainder of the subtraction is zero.

6. A method of operating a user-interactive system for performing communication between a first user's data communication apparatus and a second user's communication apparatus connected thereto via a communication line, said method comprising:

a reception step of receiving images sent from the second user's communication apparatus via the communication line;

an error detection step of detecting synchronization of the received images and generation of an error;

an image detection step of detecting whether or not said reception step has received the image, the system including an image memory in which a first control image for giving notice of an error generation and a second control image for giving notice that the image is not received have been previously stored; and a supply step of selectively supplying one of the images received by said reception step and the first and second control images stored in the image memory to a display means to be displayed thereby, wherein said supply step selectively supplies the one received image and the first and second control images according to detection results output from said error detection step and said image detection step, such that said supply step supplies the one received image to the display means when said error detection step does not detect an error generation and supplies the first control image to the display means when said error detection step detects an error generation, and supplies the second control image to the display means when said image detection step detects that the image is not received.

7. A method of operating a user-interactive system for performing communication between a first user's multimedia communication apparatus and a second user's communication apparatus connected thereto via a communication line, said method comprising:

a first communication step of communicating with the second user's communication apparatus by using image information sent via the communication line, the system including an image memory in which a control image for giving notice that a communication of the image data is not being performed has been previously stored;

a second communication step of communicating with the second user's communication apparatus by using voice and data information sent via the communication line;

a discrimination step of discriminating if communication of an image is being performed by said first communication step; and a selection step for selectively supplying a display means with the image used for communication or the control image, wherein said selection step supplies the image being communicated by said first communication step to the display means when said determination step determines that communication of the image is being performed, and supplies the control image to the display means when said determination step determines that communication of an image is not being performed, wherein the first user's communication apparatus and the second user's communication apparatus perform a pre-procedure to determine a first amount of information that can be communicated therebetween, and wherein said discrimination step subtracts a second amount of information that is required for communication performed by said second communication step from the first amount of information, and said discrimination step determines that image communication is not performed if a remainder of the subtraction is zero.

* * * * *

UNITED STATES PATENT AND TRADEMARK OFFICE
CERTIFICATE OF CORRECTION

PATENT NO. : 5,524,194
DATED : June 4, 1996
INVENTOR(S) : MAKOTO CHIDA ET AL.

Page 1 of 2

It is certified that error appears in the above-identified patent and that said Letters Patent is hereby corrected as shown below:

On the title page
AT [56] REFERENCES CITED

Attorney, Agent or Firm,
    "Fitzpatrick Cella Harper & Scinto" should read
    --Fitzpatrick, Cella, Harper & Scinto--.

COLUMN 5

Line 5, "connected" should read --connected to--.

COLUMN 8

Line 8, "may" should read --may be--.

COLUMN 10

Line 8, "inhibit" should read --inhibiting--.

COLUMN 13

Line 15, "S234." should read --S234).--.

COLUMN 16

Line 1, "form" should read --from--.

UNITED STATES PATENT AND TRADEMARK OFFICE
CERTIFICATE OF CORRECTION

PATENT NO.  : 5,524,194
DATED       : June 4, 1996
INVENTOR(S) : MAKOTO CHIDA ET AL.

It is certified that error appears in the above-identified patent and that said Letters Patent is hereby corrected as shown below:

COLUMN 19

Line 47, "the" (first occurrence) should be deleted.

Signed and Sealed this

Sixteenth Day of September, 1997

*Attest:*

BRUCE LEHMAN

*Attesting Officer*       *Commissioner of Patents and Trademarks*